(12) United States Patent
Díaz Cambronero et al.

(10) Patent No.: US 12,520,993 B2
(45) Date of Patent: Jan. 13, 2026

(54) MODULAR SYSTEM FOR MONITORING AND CONTROLLING THE HOMEOSTASIS IN CAVITIES, AND A METHOD FOR GENERATING A VOLUME OF FLUID IN A CAVITY

(71) Applicants: FUNDACIÓN PARA LA INVESTIGACIÓN DEL HOSPITAL UNIVERSITARIO Y POLITÉCNICO LA FE DE LA COMUNIDAD VALENCIANA, Valencia (ES); FUNDACIÓN DE LA COMUNIDAD VALENCIANA HOSPITAL GENERAL PARA LA INVESTIGACIÓN BIOMÉDICA, DOCENCIA Y DESARROLLO DE LAS CIENCIAS DE LA SALUD, Valencia (ES)

(72) Inventors: Óscar Díaz Cambronero, Chiva (ES); Guido Mazzinari, Valencia (ES); Blas Flor Lorente, Puzol (ES); Lucas Rovira Soriano, La Eliana (ES)

(73) Assignees: FUNDACIÓN PARA LA INVESTIGACIÓN DEL HOSPITAL UNIVERSITARIO Y POLITÉCNICO LA FE DE LA COMUNIDAD VALENCIANA, Valencia (ES); FUNDACIÓN DE LA COMUNIDAD VALENCIANA HOSPITAL GENERAL PARA LA INVESTIGACIÓN BIOMEDICA, DOCENCIA Y DESARROLLO DE LAS CIENCIAS DE LA SALUD, Valencia (ES)

( * ) Notice: Subject to any disclaimer, the term of this patent is extended or adjusted under 35 U.S.C. 154(b) by 915 days.

(21) Appl. No.: 17/642,655

(22) PCT Filed: Sep. 12, 2020

(86) PCT No.: PCT/EP2020/075580
§ 371 (c)(1),
(2) Date: Mar. 11, 2022

(87) PCT Pub. No.: WO2021/048429
PCT Pub. Date: Mar. 18, 2021

(65) Prior Publication Data
US 2022/0322912 A1    Oct. 13, 2022

(30) Foreign Application Priority Data
Sep. 12, 2019  (EP) .................................... 19382791

(51) Int. Cl.
*A61B 1/00* (2006.01)
*A61B 1/05* (2006.01)
(Continued)

(52) U.S. Cl.
CPC ...... *A61B 1/00006* (2013.01); *A61B 1/00045* (2013.01); *A61B 1/00055* (2013.01);
(Continued)

(58) Field of Classification Search
CPC .. A61M 13/00; A61M 13/003; A61M 13/006; A61B 17/3474
See application file for complete search history.

(56) References Cited

U.S. PATENT DOCUMENTS

| 5,006,109 A | 4/1991 | Douglas et al. |
| 5,246,419 A | 9/1993 | Absten |

(Continued)

FOREIGN PATENT DOCUMENTS

| DE | 4240758 A1 * | 6/1993 | .......... A61M 13/003 |
| DE | 102012110889 A1 | 5/2014 | |

(Continued)

OTHER PUBLICATIONS

DE 4240758 A1 machine translation (Year: 1993).*

(Continued)

*Primary Examiner* — Laura A Bouchelle

(74) *Attorney, Agent, or Firm* — SQUIRE PATTON BOGGS (US) LLP

(57) ABSTRACT

The system comprises an intracavity device with an insertable portion having on its outer surface a sensor module which comprises at least a sensor of temperature, humidity or both; a second group of sensors comprising at least a volume sensor, a pressure sensor or both, wherein the fluid flows through the volume and/or pressure sensors; a fluid insufflation module; and a monitoring and control of the homeostasis module connected to the sensor module and to the second group of sensors and which comprises a processing unit.

The method comprises insufflating fluid into the cavity, to maintain a working volume and maintain the homeostasis of the cavity in a continuous manner, in particular the distensibility, temperature and humidity.

19 Claims, 8 Drawing Sheets

(51) Int. Cl.
```
A61B 1/06      (2006.01)
A61B 1/313     (2006.01)
A61B 17/34     (2006.01)
A61B 17/00     (2006.01)
```
(52) U.S. Cl.
CPC ...... *A61B 1/00097* (2022.02); *A61B 1/00105* (2013.01); *A61B 1/05* (2013.01); *A61B 1/0655* (2022.02); *A61B 1/0661* (2013.01); *A61B 1/3132* (2013.01); *A61B 17/3498* (2013.01); *A61B 2017/00084* (2013.01); *A61B 2217/005* (2013.01); *A61B 2562/0247* (2013.01); *A61B 2562/029* (2013.01)

(56) References Cited

U.S. PATENT DOCUMENTS

| | | | |
|---|---|---|---|
| 9,533,110 B2* | 1/2017 | Ott | A61M 16/0051 |
| 11,229,756 B2 | 1/2022 | Silver et al. | |
| 2007/0060915 A1 | 3/2007 | Kucklick | |
| 2012/0184897 A1 | 7/2012 | Poll | |
| 2012/0265022 A1* | 10/2012 | Menn | A61B 17/3421 600/245 |
| 2013/0255670 A1* | 10/2013 | Ott | A61M 16/0051 128/200.14 |
| 2017/0128127 A1 | 5/2017 | Skalnyi | |
| 2018/0185062 A1 | 7/2018 | Geisz | |
| 2019/0167301 A1 | 6/2019 | Geisz | |
| 2019/0268574 A1 | 8/2019 | Tsukashima et al. | |
| 2023/0012481 A1 | 1/2023 | Sterke et al. | |

FOREIGN PATENT DOCUMENTS

| | | |
|---|---|---|
| DE | 102016014980 A1 | 6/2018 |
| JP | 2005245772 A * | 9/2005 |
| WO | 2017/014623 A1 | 1/2017 |
| WO | WO 2018/039239 A1 | 3/2018 |
| WO | WO 2018/097738 A1 | 5/2018 |
| WO | 2020/117051 A1 | 6/2020 |

OTHER PUBLICATIONS

JP 2005245772 A1 machine translation (Year: 2005).*
International Search Report mailed on Dec. 10, 2020 for PCT Application No. PCT/EP2020/075580, 20 pages.

* cited by examiner

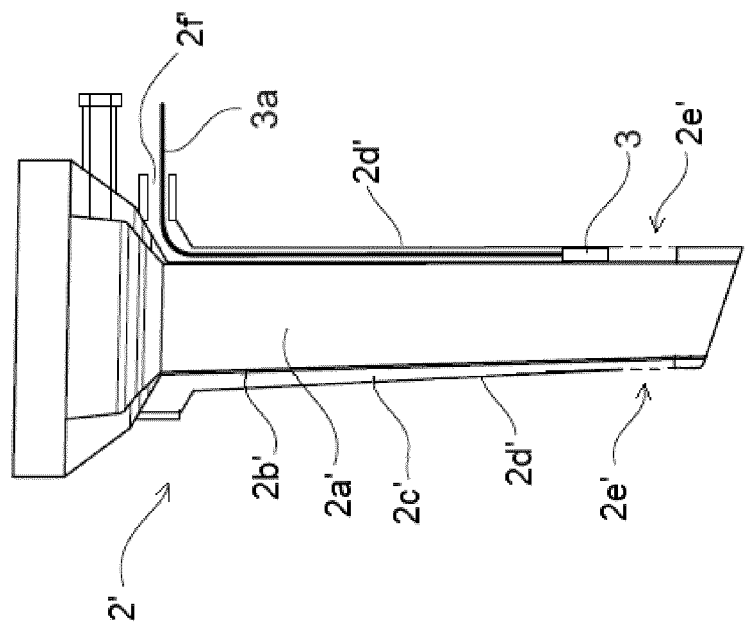
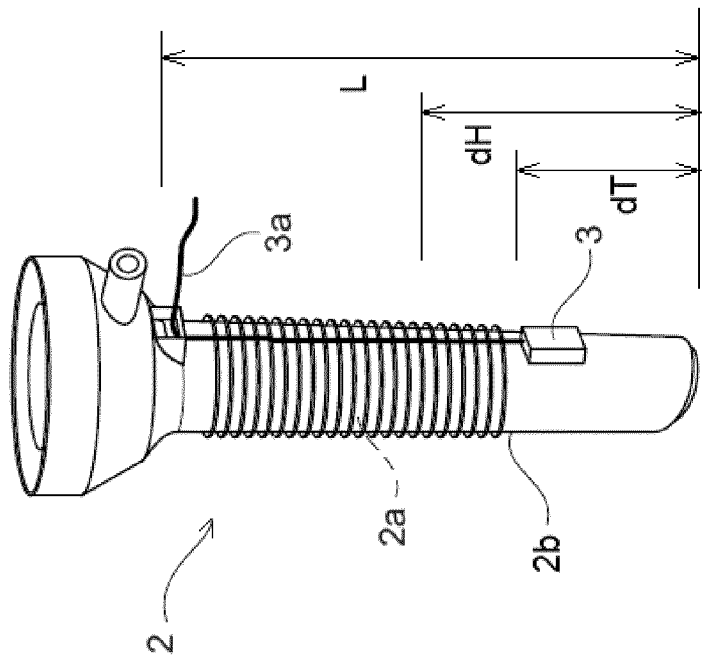
Fig. 1c
Fig. 1b

MODULAR SYSTEM FOR MONITORING AND CONTROLLING THE HOMEOSTASIS IN CAVITIES, AND A METHOD FOR GENERATING A VOLUME OF FLUID IN A CAVITY

OBJECT OF THE INVENTION

The invention relates to a system for the monitoring and control of homeostasis in cavities. Specifically, the invention relates to a modular type of system for use in natural cavities, such as cavities in organs, or in artificial cavities generated in humans or animals.

The invention also relates to a method of monitoring and control of the homeostasis in cavities, more specifically, to apply a combination of control techniques/systems to maintain relatively constant the composition and properties of the medium which tend to vary when fluid is introduced to the cavity to enable endoscopic techniques.

Another object of the present invention relates to a method of generating an optimal volume in a cavity, more specifically, by the insufflation of a fluid or gas thereto.

PRIOR ART OF THE INVENTION

Continuous insufflation of gas is necessary in endoscopic surgery in order to create a working space enabling the manipulation of the surgical instruments in a secure manner in the interior thereof. The insufflation of gas to a body cavity is currently implemented via devices called trocars. An insufflation device injects gas via trocars to the interior of a cavity until a previously set pressure in the cavity is achieved, which usually varies between 12 and 25 millimeter of mercury (mmHg).

Nevertheless, the stored gas which is introduced to the cavity to implement an endoscopic procedure is, normally a gas, for example carbonic anhydride ($CO_2$), with a temperature of approximately 20° C., and with a low relative humidity, close to 0%.

The introduction of a cold and dry volume of gas under pressure to a cavity provokes alterations in the intracavity homeostasis, increasing pressure and decreasing temperature and humidity. This provokes a direct lesion and another indirect lesion in the cavity which are proportional to the duration of the surgery and the total volume and the pressure of the gas injected into the cavity which has a great impact on the recuperation of the patient.

For example, laparoscopic surgery is a common endoscopic procedure, wherein gases introduced (insufflated) into the abdominal cavity, which normally produces a direct lesion of the mucosa which covers vital organs, termed the peritoneum, with an increased risk of the formation of postoperative adhesions and the risk of metastasis of tumor cells. The indirect lesion derives from subjecting the patients to transitory abdominal hypertension or compartment syndrome, depending on the degree of abdominal pressure, and this is associated with a hyper perfusion and/or hypo perfusion of some vital organs such as, for example, the liver, the kidneys, the stomach and the abdominal wall, among others. In addition, hemodynamic alterations may be produced and a tendency to pulmonary collapse or atelectasis, with a greater risk of postoperative complications.

Endoscopic surgery has evolved in the direction of the utilization of devices which are ever less invasive and with greater resolution of the imaging systems, as is the case with robotic surgery or single incision surgery, in which there is a need for only a single intracavity device to implement all of the procedure. Nevertheless, no solutions are known which permit continuous monitoring of the modifications of the intracavity parameters (distensibility, humidity, temperature, illumination and other) which are necessary to enable a direct, adaptive and individualized treatment.

Insufflation endoscopes utilize various trocars, wherein the channel of one of the trocars is utilized in order to introduce a gas to reach the target intra-cavity pressure, while the exit of the gas is achieved passively via the remainder of the trocars during the manipulation of the surgical instruments, or actively by the opening of one of the valves of a trocar. This results in the introduction of elevated quantities of gas during a surgical procedure, which in some occasions is greater than 100 to 200 L/h, which exacerbate the lesion produced by the pressure with a direct lesion caused by desiccation and cooling. Moreover, elevated quantities of $CO_2$ gas are generally exhausted to the atmosphere, which contributes to the greenhouse effect, as well as particulates which are potentially toxic or carcinogenic, producing a potentially adverse exposure for the personnel of the operating theater, as well as for the environment.

The insufflation of gas to a cavity is based on the principle that all volume within a cavity generates a pressure, with a proportional relationship in which a greater volume of insufflation causes greater intracavity pressure. An adequate space for laparoscopic surgery is associated more with the intra-abdominal volume than with the intraabdominal pressure reached. Nevertheless, with continued insufflation of gas, a point or zone of inflection is reached wherein, depending on the characteristics of each patient, an increase of the intra-abdominal pressure only generates a minimal or no increase of the volume of the cavity, without improving the working space, but with increased associated complications resulting from the increased pressure (Diaz-Cambronero O, Flor Lorente B, Mazzinari G, Vila Montañes M, García Gregorio N, Robles Hernandez D, Olmedilla Arnal L E, Argente Navarro M P, Schultz M J, Errando C L; IPPColLapSe study group. *A multifaceted individualized pneumoperitoneum strategy for laparoscopic colorectal surgery: a multicenter observational feasibility study*. Surg Endosc. 2019 January; 33(1):252-260. doi: 10.1007/s00464-018-6305-y. Epub 2018 Jun. 27).

The operator currently sets a target pressure and the gas is insufflated to the cavity until the set pressure inside of the cavity is reached, which is transmitted throughout the system and is registered by the insufflator.

Recently, various solutions have been launched on the market with an endoscopic insufflator which comprise a single conduit of gas with three channels, and a single camera intracavity device. These solutions introduce and extract gas in a continuous manner to maintain a target intracavity pressure by means of a sealed pneumatic mechanism involving gas kinetics (by means of the Venturi effect), and employ low pressures, recirculating the used volume of gas. Nevertheless, this pneumatic seal may allow the contamination of the gas with air, which may result in potential complications. Normally, $CO_2$ gas is used because it is noncombustible and is much more soluble in the body, which enables a rapid resorption without buildup. The passage of air into a body cavity produces a risk of combustion which did not exist previously, and prolongs the elimination time by being accumulated in the body, elevating the risk of the appearance of subcutaneous emphysema, of gaseous embolism, of pneumothorax, and other serious complications for the patient. Working with lower intracavity pressures is associated with less injury, but these solutions only allow working at lower pressures which are fixed in advance, without the possibility of adaptation to fluctuating circumstances with the concomitant risk of resulting in non-optimal conditions or not allowing the completion of the medical procedures.

Some of the solutions, designed to avoid leaks in the cavity insufflator circuit, measure the pressure of the patient's cavity via a pressure sensor disposed in, or on, an intracavity device in the patient's cavity. Subsequently, the insufflation fluid is administered to the patient's cavity and the pressure in the cavity of the patient is measured by the pressure sensor. The administration of the insufflation fluid by an insufflation to the patient's cavity is controlled based on the measured pressure. Nevertheless, measuring the total insufflated volume via the pressure established by the operator introduces a degree of error in the precision, since the measured volume does not really correspond with the working space.

There are also known solutions which describe means of conditioning of the insufflated gas, such as a heater to heat said gas and a humidifier to humidify the gas. The problem is that the heating is not controlled by previous measurement of the conditions in the cavity (also known as basal conditions), with the result that there is similar heating whether it is cold or hot, independent of the volume insufflated, etc. Thus, the system works to heat the gas to a preestablished temperature which is not a variable, nor adaptive.

The existent heating systems have not demonstrated benefits in the recuperation of the patient. In fact, they increase the drying of the mucosa which covers the cavity and cool the surface by evaporating the humidity present in the cavity, unless they are associated with a humidifier system.

DESCRIPTION OF THE INVENTION

The invention relates to a modular system designed to permit the monitoring and control of the working space and its properties and maintaining homeostasis during introduction of a fluid, whether liquid or gas, into different body cavity types, which may be natural, artificial, human, animal or others, to generate a working space in endoscopic procedures.

The homeostasis of an environment may be monitored based on various fundamental parameters, such as the pressure, the volume, the temperature and humidity of said environment.

A modular system disclosed herein comprises at least one intracavity device, which is introduced into the interior of the cavity, at least one sensor module attached to the intracavity device and connected to a monitoring and control module of the homeostasis. The intracavity device may be, for example, a trocar.

The intracavity device has an insertable portion, towards its distal end, where the sensor module is attached, and wires may extend inside or outside the intracavity device to allow connecting the sensor module to the monitoring and control module of the homeostasis. In this manner, the insertable portion of the intracavity device is introduced into the cavity, and permits the passage of fluid, whether liquid or gas, as well as the transmission of data from the sensor module that is inside the body cavity. The sensor module comprises at least one temperature sensor, or humidity sensor or both, which enable measurement and transmission of the temperature and/or the humidity of the environment in the interior of the cavity, e.g. in real time.

The sensor module may be arranged on the intracavity device but outside the channel or cannula for the passage of fluid towards the cavity and isolated or separated from this fluid, to obtain readings of the temperature and/or humidity existing inside the cavity, and not those of the fluid flowing through the cannula.

The sensor module may be positioned in the distal half of the insertable portion or length of the intracavity device, for example in the distal third of the insertable portion or length, to ensure it is in contact with the interior space of the cavity during use. Preferably it is at a distance of at least 10 mm, for example at least 20 mm, from the distal end of the intracavity device, to avoid touching directly the cavity surfaces once inserted.

The system described above enables the monitoring of the intracavity homeostasis by enabling measurement of the properties of the fluid that is present in the interior of the cavity, from the moment the intracavity device is inserted in the cavity and even before any fluid is insufflated in the cavity for increasing the volume for the endoscopic procedure, thereby allowing the basal conditions (temperature, humidity) of the patient to be measured.

To this end, the disposition of the sensor module (avoiding direct contact with fluid introduced) is of great importance, by enabling sensing of the properties of the environment in the interior of the cavity in situ, instead of extracting the fluid for the later measurement of its properties, which may modify the same, or instead of measuring the properties of the fluid that is being introduced into the cavity through the lumen of the intracavitary device, which would give inaccurate results.

A second group of sensors (tachometer, flowmeter, pressure sensor . . . ) may be placed in any other part of the device or in the linking conduits, with the sensors arranged such that the insufflated fluid flows through them. All the information provided by the temperature and humidity sensor module, as well as from the second group of sensors, is centralized and processed by a control module.

The intracavity device preferably consists of a trocar, which may be a single channel or a double channel trocar. The trocar permits access to the cavity and insufflation or aspiration of fluid to and from said cavity. In addition, the double channel trocar enables a reduction in the number of trocars necessary for the intervention, since the insufflation and aspiration of fluid is enabled with the same trocar. In this case, the sensor module may be isolated from the channel of the trocar through which fluid is insufflated into the cavity (avoiding direct contact with fluid introduced), and be arranged in the channel of the trocar thorough which fluid is suctioned and removed from the cavity, as this fluid has a temperature and humidity of the interior of the cavity.

The monitoring and control module of the homeostasis may additionally comprise a module for the insufflation of fluid, designed to generate a flux of fluid towards the cavity, and which may take the form of a ventilator, an insufflator, a pump and the like, and a connection designed to be connected to the fluid insufflation module, for the purpose of not only monitoring the intracavity homeostasis, but also controlling the modular system to maintain the homeostasis in the interior of the cavity. The fluid passes through a first conduit from the monitoring and control of the homeostasis module to arrive finally at the intracavity device. The sensors of the second group (pressure, volume) are placed between the insufflator module and the intracavitary part of the device (trocar), while the sensor module (humidity and temperature) is placed near the distal end of the intracavitary device (trocar).

The sensors therefore measure the volume and pressure of fluid released into the cavity, which allows determining the distensibility of the cavity, as well as the humidity and temperature of the environment in the interior of the cavity: these properties are measured by the sensors and transmitted to the monitoring and control of the homeostasis module, which comprises a processing unit configured to receive the data. The processing unit operates the device so that it maintain a working volume in the cavity, according to the distensibility of the cavity of the specific patient, position, etc., instead of simply operating at a working pressure without taking into account the distensibility of the particular patient and situation, which is the known practice in the prior art.

The device also allows calculating the distensibility of the cavity, to set the appropriate volume during the endoscopic procedure, and reducing humidity and temperature variations, returning to basal (or less harmful) conditions, despite fluid insufflation.

The distensibility of the cavity may be determined dynamically (e.g. at periodic intervals) during the endoscopic procedure, such that a set volume to be maintained during the procedure may be modified to work throughout the whole procedure in the most favourable conditions while at the same time keeping the risk for the patient as low as possible.

The fluid insufflation module may be a conventional insufflator which generates a flux of fluid towards the cavity, e.g. at a constant pressure. This type of device enables fixing the insufflation pressure, such that the insufflator introduces the fluid until the pressure in the interior of the cavity reaches the previously determined insufflation pressure.

According to one aspect, the present disclosure provides a modular system for the monitoring of the homeostasis in cavities for endoscopic procedures as claimed in claim 1.

Measuring the temperature and humidity using a module sensor arranged as claimed allows an accurate determination of the parameters inside the cavity itself, as opposed to measuring the parameters of the fluid that is being insufflated, which cannot provide an accurate measure of the conditions of the fluid that is inside the cavity. It also allows efficiently determining the basal temperature and humidity of the cavity before fluid is insufflated, such that during the endoscopic procedure the basal conditions may be maintained, by monitoring the temperature and humidity during the procedure, comparing them with the basal data, and heating and/or humidifying the insufflated fluid if convenient to bring the cavity conditions back towards the basal values.

Furthermore, the features of the claimed system enable maintaining a set volume throughout the endoscopic procedure, i.e. a working volume which may be established by the surgeon and registered in the system. The volume in the cavity is determined based on the data from the volume and pressure sensors, by using these data to model the distensibility of the cavity, i.e. to establish the correlation between the pressure and the volume inside the cavity.

The distensibility of the cavity may vary during the procedure, and may therefore be determined dynamically (e.g. at periodic intervals).

On the contrary, known insufflators only allow setting and maintaining in the cavity a certain working pressure, which is set depending on historical data based on a few parameters, and on the experience of the surgeon: for example, there is a usual, recommended pressure value that is set and maintained during an endoscopic procedure on a specific cavity, e.g. the abdomen, depending on the patient sex and age. In order to reduce the risk of injury, setting a fixed, preestablished pressure for the endoscopic procedure entails generally working at relatively low pressures, and therefore with relatively low cavity volumes, which in some cases unduly restricts the space available to the surgeon for the procedure; if the surgeon decides to set a higher pressure, he/she does it without being able to assess the risk for the patient.

Thus, while known apparatuses allow to set and maintain a pressure value, what the surgeon needs in order to operate comfortably and safely is a certain volume in the cavity: sometimes a volume as high as possible, for example as high as the cavity may withstand without a high risk of suffering serious damage.

Of course, the pressure and the volume in a body cavity are related; however, the function relating them is different for each particular cavity (e.g. abdomen thorax, etc.) and for each particular patient (depending on age, sex, physical fitness and many others), and also depend on the conditions during the endoscopic procedure, such as the patient position, the temperature and humidity, etc.

The claimed system, by being able to maintain a working volume instead of a working pressure, provides to the surgeon the possibility of adapting each procedure to the particular cavity, patient and conditions of each endoscopic procedure.

Furthermore, the distensibility of a cavity of a patient, i.e. the capacity of the cavity of expanding without the risk of suffering serious damage, may depend also on the temperature and on the humidity, as body tissues are affected by these parameters, and others. When the temperature and/or humidity are close to the basal temperature and humidity, the distensibility of the cavity is maximum, and therefore maintaining these conditions in the cavity may allow working at a higher volume and giving more space to the surgeon for the endoscopic procedure.

Therefore, the claimed system provides a synergistic effect by combining temperature and humidity sensors that are arranged to give accurate data of the conditions inside of the cavity (and not of the fluid being insufflated), with a system that is able to maintain a set working volume in the cavity during the endoscopic procedure, because working with a high cavity volume is facilitated by virtue of the accurate monitoring of the temperature and humidity.

On the contrary, in the prior art a predetermined working pressure is set and maintained in the cavity without taking into account the properties of the particular patient and conditions of each endoscopic procedure (only on e.g. age group, sex, type of cavity, etc.). Therefore in the prior art, even if accurate basal temperature and humidity data were sensed before each procedure and maintained throughout the procedure (which they are not), this information would not lead to a facilitation for the surgeon, because there is no adjustment of the working pressure to each particular patient, cavity and procedure conditions.

The working volume may be inputted and recorded in the processing unit prior to any insufflation of fluid, but it may also be inputted after some fluid is insufflated; furthermore, a modified value of the working volume may be inputted and recorded in the processing unit at any time during the procedure, such that the system may maintain a different working volume at different times during the endoscopic procedure.

The process of measuring the volume in the cavity, comparing it to the recorded working volume, and reestablishing the recorded working volume if the difference is above a predetermined threshold, may be performed continuously throughout the endoscopic procedure.

According to another aspect, the present disclosure provides a method of generating and/or maintaining a volume in a body cavity during endoscopic procedures, by using a fluid, as claimed in claim 17.

The monitoring and control module of the homeostasis may additionally comprise a solenoid valve, linked to the sensor of the volume or pressure, or both, in series with these sensors and connected to the processing unit, the solenoid valve controlling the passage of the fluid through these sensors. Thus, when the fluid insufflation module introduces the fluid to the cavity, the monitoring and control of the homeostasis module can monitor not only the temperature and the humidity of the intracavity environment, but also the pressure and the volume which actually exists within the cavity.

The provision of the solenoid valve allows using in embodiments of the present invention a conventional, commercially available insufflator, and therefore adapting a commercial apparatus and converting it into a system according to the invention and able to perform methods as disclosed herein, including obtaining the distensibility curve of the cavity and working controlling and maintaining a working volume.

In other embodiments of the system, the valve may be omitted.

The integration of the sensor of pressure and/or volume with a solenoid valve enables control of the fluid insufflation to the cavity, and enables the detection of the pressure increase generated by each insufflated volume; this data is processed by the CPU or processing unit, enabling the establishment of a pressure/volume curve of that cavity (distensibility curve) in that patient. All of this enables the provision of information to the user to set an appropriate working volume for the actual patient and subsequent fluid insufflation to reach and maintain that volume. The working volume is determined by the user based of their knowledge and experience (for example, an adequate or necessary volume in order to operate on the patient) and the information provided by the system (for example, an optimal volume or optimal range of volumes for the particular patient and the usual volume for each type of surgery). In addition, the sensing of intracavity pressures and volumes is enabled continuously, such that the volume during the endoscopic procedure can be adapted to that necessary to work with the most appropriate pressure (the lowest possible pressure).

Closing the solenoid valve enables isolation of the pressure of the cavity from the previously fixed pressure of the fluid administered by the insufflator. Furthermore, this not only enables monitoring of the pressure in the interior of the cavity, by being isolated from the pressure of the insufflator, but also the control thereof. To this end, the monitoring and control module of the homeostasis primarily measures the volume of fluid introduced, by means of a sensor, and closes the solenoid valve on reaching a preestablished value, followed by measuring the pressure of the fluid between said solenoid valve and the cavity, by means of the same sensor or another distinct sensor.

Alternatively, the monitoring and control of the pressure in the interior of the cavity may be enabled by means of the monitoring and control of the homeostasis module, measuring the pressure increase in the cavity, and closing the solenoid valve on reaching the preestablished value, and promptly measuring the resulting variation of the volume of the cavity produced by this pressure increment.

Moreover, the inclusion of the solenoid valve combined with the use of an insufflator which produces a continuous flux of fluid at a constant pressure enables the generation of a volume in a cavity setting a predetermined working volume as a target, instead of a working pressure. This thus enables a change in the work mode, changing from an insufflator which works at a set pressure to an insufflator which works at a set volume.

Thus, the insufflator works off volume, unlike all of the current insufflators which work off pressure, a working volume is established manually; e.g. for laparoscopic surgery the working volume is preferably 3 liters±0.5 liters, such that the range is from 2.5 to 3.5 liters.

Furthermore, the system enables a measurement of the potential for expansion of the cavity in the patient, for a predetermined endoscopic process, enabling the possibility to be informed of the intracavity pressure/volume, and allowing the surgeon to be informed as to whether the desired working volume is within the optimal volume range or not and the relationship thereof to the usual volume for each type of surgery. For that purpose, for example, a fluid flux is insufflated via the insufflator, followed by measuring the volume of fluid introduced by means of a volume sensor, and on reaching the preestablished value (For example, 0.3 liters of insufflation, or any other value), a solenoid valve is closed to isolate the cavity and the pressure generated in the cavity is measured, for example, via a pressure sensor, thus enabling the computation of the relationship which exists between the volume of fluid introduced and the pressure which said volume generates in the cavity. Various iteration of this fluid insufflation process are performed, measurement of the volume introduced, isolation of the cavity and measurement of the pressure, for example, until a predetermined maximum value of the volume and/or pressure is reached, and the results of the computation of the potential for expansion is a curve of the relationship between the volume introduced and the pressure generated in the cavity. It has been established that this curve exhibits a point or zone of inflection, from which a small increase in the volume of the cavity causes a disproportionate increase in the pressure generated.

In addition, this homeostasis system preferably enables informing the user as to the working volume considered necessary to execute the procedure within the optimal range, bearing in mind this characteristic of the curve of the potential for expansion. The upper limit of this range may be the maximum volume, above which the increase in pressure is disproportionate, in other words, the point of inflection of the curve of the relationship of the pressure to the volume, and the lower limit of the optimal volume range may be determined to be the volume to generate the minimum pressure necessary to maintain a certain tension in the walls of the expanded cavity, thus avoiding that the cavity might be deformed and/or be collapsed too easily, for example, by contact with the instrumentation employed in the cavity. The lower limit could be a predefined pressure or volume value based on statistical data. For example, a normal minimum pressure in laparoscopic surgery would be 6-8 mmHg.

In addition to calculating the range of optimal volumes, the system may incorporate in a preprogrammed manner the data of the usual volumes for each type of surgery in the form of a table, a formula, a database and the like, depending on the type of surgery, age or gender of the patient, previous surgery and/or pregnancies, the patient position in the intervention, and/or other parameters; and may present these data to the surgeon, for example, in the same graph together with the already determined range of optimal volumes. In this manner, the determination by the surgeon of the working volume at which the device must function, based on the range of optimal volumes and the usual volume used by the surgeon, is enabled.

The distensibility curve, and thus the range of optimal volumes, may vary during the procedure, on varying the position and the conditions of the patient, or of the surgery, and thus the point where the set working volume can be found with respect to the optimal range may also vary. Consequently, a method of maintaining or generating homeostasis of conditions in the cavity during the endoscopic process according to any of the claimed or described embodiments in this specification may additionally comprise periodically recalculating the distensibility curve during the course of the endoscopic procedure, and presenting that information in a graphic interface or in another manner, as well as, optionally, the relationship of the set volume at a given moment in the device with respect to the recalculated distensibility curve, and/or with respect to a recalculated range of optimal volumes.

Determining the curve of distensibility, i.e. modeling the behaviour or distensibility of the cavity for each particular endoscopic procedure, by establishing the correlation between the pressure and the volume inside the cavity, affords multiple advantages:

knowing at any time which is the volume inside the cavity;

knowing at any time which is the theoretical optimum working volume, as a guide for the surgeon, who can in practice decide to work with a lower or higher volume;

informing the surgeon if his/her chosen working volume is close to the optimum volume, or should be increased or decreased;

maintaining the set working volume, by continuously comparing the volume in the cavity with the set working volume. In the prior art a set pressure is maintained in the cavity, e.g. in case of a pressure decrease more fluid is insufflated until the set pressure is reestablished; in embodiments of the invention, the processing unit maintains the set volume by virtue of the curve of distensibility. In case of a decrease in the pressure, the curve allows to know the resulting volume in the cavity, and fluid may be insufflated until the set volume is reached again.

Some advantages of examples of the invention may be summarized as follows:

Examples of the system not only enable the calculation/measurement of the distensibility curve and the range of optimal volumes for each patient during the initial insufflation, but allows to do so also in a continuous manner, adapted to all of the changes which occur during the procedure;

Examples of the system enable the integration of the usual volume data for each type of surgery in a preprogrammed manner in the device and integrated display thereof together with the optimal range of volumes;

The secure and precise determination by the surgeon of the working volume at which the device should function, in each specific surgical intervention, based on the data of the range of optimal volumes, and if necessary, the usual volume, is enabled;

A system according to examples of the invention enables working at a set volume, specifically at a working volume established manually by the surgeon, based on the provided information, that of the procedure, and of the characteristics of the patient;

Examples of the system are capable of informing (For example, exhibiting the generated and processed information on a screen) as to whether the set volume value would generate an excessive pressure or whether it falls within a range of optimal volumes determined for the particular patient and the +specific conditions of the endoscopic procedure. The set working volume could be modified manually by the surgeon according to the requirements of the procedure based on this information, ideally reduced to generate the least possible pressure. It may not be possible to reduce it in some circumstances, and then it is maintained, but always being aware that the set volume lies outside the optimal range, for example, above the point of inflection of the distensibility curve.

The monitoring and control of the homeostasis module may additionally comprise a humidifier and heating module, which preferably has a variable output, with the objective of enabling a more exhaustive control of the homeostasis in the interior of the cavity. This module is controlled by the processing unit of the monitoring and control of the homeostasis module, and permits the modification of the humidity and/or the temperature of the insufflation fluid as a function of the sensor data obtained by a sensor module, with the object of maintaining the homeostasis conditions in the interior of the cavity, that is to say, without said homeostasis conditions being altered by the introduction of the fluid flux. Control of the temperature and humidity of the fluid flux introduced to that of the temperature and humidity exhibited in the interior of the cavity is enabled, thus avoiding potential lesions and problems generated by the introduction of a cold and dry fluid to a cavity. The conduits which connect the monitoring and control of the homeostasis module with the intracavity devices could themselves be heated, for example by an integrated resistance, to avoid loss of heat in the transit between modules.

Alternatively, the insufflation of fluid module may comprise at least one impeller pump, which preferably has a variable flow, instead of a conventional insufflator. This impeller pump enables the generation of a fluid flux from and/or towards the cavity, for the purposes of enabling precise control of the quantity of fluid present in said cavity. The fluid introduced is derived from a source of fluid connected to the monitoring and control of the homeostasis module, which may be, for example, a $CO_2$ cylinder. The use of a variable flow impeller pump enables more precise control of the quantity of fluid introduced into the interior of the cavity, enabling adaptation of the flux of the fluid to the requirements in every instant. Thus, the fluid flux would be higher in the initial instances, when there is a contrivance at increasing the volume of the cavity, and it would be reduced during the process as the optimal volume is approximated.

The inclusion of an impeller pump enables insufflation of fluid to the cavity to the working volume, integrated with sensors enabling detection of the volume existing in the cavity and the pressure which this volume generates in the cavity. Thus, the working volume is first determined, followed subsequently by insufflating gas until that working volume is reached and maintained, by means of an impeller pump, constantly detecting the pressure and volume in the cavity with the object of adapting the volume of the cavity as necessary, in order to work under the least possible pressure.

The fluid insufflation module may additionally comprise at least one suction pump, which is preferably of variable flow synchronized with the impeller pump. In this manner, adaptive control of the fluid volume in the cavity is enabled in a manner which, if the generated volume is excessive, the suction pump can extract the fluid necessary. This characteristic also enables modification of the volume of the cavity when a decision is made to use a working volume during the procedure which is distinct from the previously determined working volume.

The system of the invention may also comprise a second fluid conduit to connect the intra-cavity device to the monitoring and control of the homeostasis module, for the purposes of producing a recirculation flux between the cavity and the source of fluid, wherein this second conduit closes the circuit which is established between the cavity and the source of fluid via the first conduit. Preferably, the same intracavity device enables the passage of fluid towards the interior of the cavity, via the first conduit, and to the exterior of the cavity, in an independent manner, via the second conduit, establishing a recirculation circuit (closed circuit) through which the fluid of the source of the fluid is conducted via the monitoring and control of the homeostasis module, by means of an impeller pump, and passes thereafter to the first conduit such that there is introduction thereof to the sensor module, disposed in the intracavity device, and is finally discharged into the cavity, via the intracavity device. The fluid in the interior of the cavity is extracted therefrom via the suction pump, causing the passage thereof through the intracavity device towards the second conduit, which leads to the monitoring and control of the homeostasis module, to finally return to the source of fluid, or towards and extraction of gases module, without being vented to the environment.

In this manner, the control of the volume of the cavity is enabled via the monitoring of the volume of recirculating fluid, the pressure generated in the cavity and the volume of new fluid entering. When there is a decrease in the pressure and the volume, this is understood as a loss of fluid, for example, because fluid was aspirated from the cavity due to a hemorrhage, and this is compensated by introducing extra fluid until the working volume is reached, something which should result in the same pressure reached previously.

In particular, during the endoscopic procedure an estimated value of the volume present in the cavity may also be obtained not based on the readings of the flowmeter or other volume sensor, but based on the pressure in the cavity as measured by the pressure sensor and on the distensibility curve (previously obtained), as the curve gives a set of corresponding cavity pressure and cavity volume values.

This estimated value of the volume may then be compared to the recorded working volume, and if the difference, in absolute value, between the two is above a predetermined threshold, fluid may be insufflated into the cavity or extracted from the cavity, to reestablish the recorded working volume.

This may e.g. allow compensating for a fluid loss in the cavity and maintaining the desired working volume.

The pressure in the cavity may be measured, and an estimated value of the volume may be determined from the pressure and distensibility curve as described above, periodically during the endoscopic procedure, and/or in case a fluid loss is suspected, and the working volume may then be reestablished.

Furthermore, the pressure in the cavity may also be continuously monitored, and the above estimation and correction of the volume in the cavity may be carried out if a pressure decrease is detected, which may indicate a fluid loss and therefore a consequent decrease of the volume.

It is important to note that this procedure is not analogous to the method known in the prior art that consists in monitoring the pressure and maintaining a constant pressure in the cavity. The pressure reading is still employed in order to determine what volume is present in the cavity, and insufflate fluid in order to maintain a desired working volume in the cavity throughout the endoscopic procedure (which of course corresponds to a certain pressure), the desired working volume being set by the surgeon based on his experience and also with the help of the distensibility curve previously obtained.

Preferably, the circuit established may comprise at least a particulate filter disposed between the fluid source and the sensor module, in other words at any point in the recirculation circuit, for the purposes of avoiding the reintroduction of fluid containing suspended particles which may cause lesions in the interior of the cavity, as well as to avoid the expulsion to the environment of noxious gases to the health or the environment. Specifically, the particulate filter can be disposed between the suction pump and impeller pump.

Alternatively, the system of the invention may produce the recirculation flux between the cavity and the source of the fluid via at least one second conduit connected, in this case, to at least a second intracavity device. Consequently, a closed-circuit is established which is similar to the situation described above, but availing of at least two intracavity devices to suffuse and extract the air to and from the cavity, respectively, instead of using only one which enables both functions. The second intracavity device is connected to the monitoring and control of the homeostasis module via the second conduit, and enables the passage of fluid towards the exterior of the cavity. Likewise, in this configuration, at least one particulate filter is preferably disposed between the source of the fluid and the sensor module to prevent the introduction or extraction of contaminated fluid, in other words, at any point of the recirculation circuit.

Moreover, in some of the configurations described above, the source of the fluid may coincide with the cavity, such that the fluid is extracted from said cavity, and the fluid is treated by at least one filter and the monitoring and control of the homeostasis module and is then infused once more into the cavity. Thus, on producing a recirculation flux, the particulate filter enables elimination of the gases which may be produced in the cavity, such that the fluid of the interior of the cavity is filtered without adding fresh fluid, thus avoiding the necessity of conditioning said fluid, since it is not fresh fluid.

The device may comprise an external source of fluid from which fluid may be added to the circuit when necessary, and a fluid exit through which fluid may be evacuated to reduce the volume of fluid in the cavity and to reduce the pressure, if necessary. The source of fluid may be connected to the aperture of an impeller pump of the circuit, for example, to a diversion conduit, and the circuit may comprise valves so that the impeller pump recirculates the fluid from the cavity itself or introduces fluid from the external source of fluid. The fluid exit may be connected to a point of the circuit, for example, with a diversion conduit, and the circuit may comprise valves to open or close the fluid exit and to maintain the closed circuit.

The system may also additionally comprise a camera and a CMOS sensor which are designed to be introduced into the cavity, with the object of enabling visual monitoring of the volume and the conditions in the cavity. The camera and the CMOS sensor may pass through the intracavity device and be disposed in the cavity. The system may comprise, in addition, an image analysis module which enables the obtention, display and analysis of the signals captured by the camera and the CMOS sensors. As a result, the image analysis module is connected to the camera, the CMOS sensor and the processing unit of the monitoring and control of the homeostasis module, to which the obtained data is provided.

Finally, the intracavity device may comprise one or more light sensors, one or more LEDs, or combinations of both, which enable the generation of optimal illumination conditions in the interior of the cavity, enabling the correct capture of the visual characteristics by the image analysis module. For that purpose, the visibility of the interior of the cavity is analyzed by the illumination sensors or the image analysis module, and the light of those LEDs is switched ON or OFF, on the basis of the results of said analysis. Preferably the LEDs, or other light sources that may be used, have adjustable light intensity, such that they may be switched off, or the light intensity may be decreased, if they disturb the surgeon; or may be increased to a suitable intensity, if the surgeon requires more light.

Moreover, in cases in which the volume in the cavity is determined or verified via the image analysis module, from the signals captured by a camera and CMOS sensor inside the cavity, the light sources having adjustable light intensity may be automatically controlled to increase the light intensity if the light in the cavity is insufficient for the satisfactory operation of the image analysis module.

The invention also refers to a method of monitoring and control of the intracavity homeostasis which employs one of the systems described above and comprises the steps of registering a working volume to be reached in the cavity, and subsequently, obtaining in a continuous manner data relating to the volume of the cavity and the pressure generated in the same by sensors, for example, sensors or via an image analysis module. Thereafter, the data obtained is transmitted to the processing unit of the monitoring and control of the homeostasis module and the data relating to the volume of the cavity is compared by the processing unit of the monitoring and control of the homeostasis module with the working volume previously determined or set by the user, and in the event of differences, the fluid insufflation module is subsequently activated until the volume of the cavity equals the working volume. Moreover, the working volume may be varied, for example, inputting a new working volume, such that, the method is repeated until the new working volume is achieved.

In this disclosure, it is considered that the data relating to the volume of the cavity and the working volume "conflict", or are "discordant", when the difference (in absolute value) between the measured volume and the working volume is superior to a predetermined threshold value. The same definition applies to other parameters, i.e. to the comparison of a measured temperature or humidity with a basal or reference temperature or humidity value.

The method described may additionally comprise the steps of obtaining at least temperature and humidity data of the interior of the cavity, via an intracavity device which is situated in the interior of said cavity, specifically, via the sensor module, and comparing the obtained temperature and humidity data with the basal data of the patient or a proprietary set of data. In the event that the obtained data does not coincide with the basal data, then the insufflation module and the humidifier and heating module are activated, with the object of heating and/or humidifying the fluid being insufflated such that the characteristics thereof are similar to those initially existent in the interior of the cavity, and a substantial alteration of the characteristics in the cavity during the endoscopic procedure is avoided.

The basal data of temperature and humidity for the particular patient, cavity, position, etc. in which the endoscopic procedure is performed, may be obtained from readings of the sensor module prior to insufflation of fluid into the cavity.

In the case that the insufflation module is an insufflator, the activation of the insufflation module step consists in activating the insufflator and opening a solenoid valve to connect the insufflator with the cavity; so that when the volume sensor detects that the working volume has been reached, the solenoid valve is closed to isolate the insufflator from the cavity, thus inactivating the actions of the insufflator. In the case that the volume of the cavity is greater than the working volume, fluid is subsequently actively extracted from the cavity via the second conduit which is connected to a suction pump and withdraws the fluid until the working volume is reached.

Preferably, during the activation of the insufflation module step, the pressure generated in the cavity, due to the insufflation of the volume of the fluid, may be measured, and the solenoid valve disposed between the insufflator and the intracavity device is closed for that purpose, such that constant pressure conditions are established on the cavity side of the solenoid valve which are different from the pressure supplied by the insufflator. The pressure which is established in the cavity is measured, for example, via an extracavity sensor, since this pressure is common in the closed circuit and is uniform irrespective of where measured. Subsequently, if the pressure in the cavity is below the preestablished limit and the working volume has not been achieved, the solenoid valve is reopened to continue insufflating fluid. Thus, there is security that the obtention of the working volume in the cavity does not produce an excessive overpressure in said cavity during the deployment of the method.

On the other hand, when the insufflation module comprises an impeller pump, the step of activating the insufflation module consists of activating the impeller pump, such that the impeller pump is deactivated when the volume sensor detects that the working volume has been achieved.

Preferably, when the insufflation module additionally comprises a suction pump, the activation of the insufflation module step consists in activating the impeller pump, if the volume of the cavity is less than the working volume, and activating the suction pump, if the volume of the cavity is greater than the working volume, enables the modification of the working volume to a lower value at any moment during the implementation of the method.

When the volume measured in the cavity coincides with the set working volume, both of the impeller pump and the suction pump may be halted or may function in a synchronous manner, maintaining a very low flow, but sufficient to maintain continuous recirculation of the fluid, with temperature and humidity conditions close to the basal conditions.

This process enables the obtention of a working volume in the interior of the cavity, without altering the temperature and humidity conditions, [and the] the homeostasis, and thus avoiding lesions and drying of the tissues and organs of the cavity. Preferably, the described method is implemented by previously fixing a working volume to be obtained or maintained in the interior of the cavity, which may be modified at any moment during the implementation of the method. Thus, the introduction or extraction of fluid to and from the cavity depends on the difference which exist between the working volume of the cavity at any point in time and the fixed or set working volume. Thus, the method of the invention enables obtaining said working volume, while maintaining the temperature and humidity conditions of the cavity at the same time.

The determination of the working volume to be reached in the cavity, and which is introduced into the system for maintaining therein, can be achieved in different ways, such as for example, the simple determination thereof by an expert based on their knowledge and experience.

Nevertheless, preferably, the determination of said working volume is enabled with the assistance of a method which avails of the system described above and comprises the steps of measurement, for example, by sensors, of the volume of fluid introduced, and the measurement of the pressure in the cavity, in tandem with the introduction of fluid into the cavity. By means of these measurements, the distensibility of the cavity or the relationship existing between the increase in pressure and the increase in volume may be determined, thus enabling the definition of a relationship/curve for each patient. A point of inflection is identified in the usual ranges of pressure, from which point the same increment of pressure in the cavity generates an increment of volume which is superior to the increment of volume generated below that point of inflection.

Finally, there is progression to a determination of a range of optimal volumes for each type of surgery, using the information of the distensibility curve and its point of inflection which may establish the maximum value of the range of optimal volumes. The minimum value of the range of optimal volumes, as explained above, may be a predefined value as a function of the type of surgery. For example, the minimum pressure is usually 6~8 mmHg in laparoscopic surgery, and the minimum value of the range of optimal volumes could be the volume corresponding to that minimum pressure.

In some embodiments, the system described may have some preprogrammed ranges of usual volumes for distinct operations in which the system and method are employed, based on statistical data depending on a series of parameters such as, for example, the type of surgery, the age and gender of the patient, the previous surgeries undergone and/or the pregnancies which the patient may have experienced, the position of the patient during the surgery, etc. These ranges of usual volumes may be programmed in the device, for example, in the form of a table, a function, database or the like, which were previously introduced into the control module of the device.

This method may help in the determination of the working volume, given that the surgeon or the user may be informed of the distensibility of the cavity for each patient and the actual conditions, and also, optionally, what are the usual volumes in operations such as the one planned. Thus, the surgeon may be informed of the relationship of the working volume with which they wish to work, with respect to the characteristics of each patient, type of surgery and the distensibility of the cavity in each case. With the result that the surgeon armed with this information and their knowledge can take a decision about the working volume to be introduced and set in the system.

The system may be configured to present the information in any convenient manner, including but not limited to a numerical or graphical representation on the visualization screen, visual or acoustic signals, etc., or a combination of the same, under the control of a processing unit and one or more suitable interaction and/or communication interfaces with the user.

The surgeon may set the working volume based on the information provided by the system and based on their experience, if it is possible, within the range of optimal volumes.

Once the surgeon makes a decision and introduces to the system the working volume to be maintained in the cavity during the endoscopic procedure, the system can work to maintain the working volume input, just as described in this specification.

As already described, the process may be dynamic, such that the system may recalculate the range of optimal volumes during the endoscopic intervention, for the adaptation thereof, for example, to changes in the position of the patient and can present the updated information to the surgeon.

In the event that the insufflation module is an insufflator, the measurement of the volume and the pressure in the cavity comprises the steps of opening the solenoid valve; insufflating fluid to the cavity by means of the insufflator; measuring the volume of fluid introduced, for example by means of an extracavity volume sensor such as a flowmeter arranged between the insufflator and the intracavity device; closing-off the solenoid valve; and measuring the pressure in the cavity, for example, via an extracavity pressure sensor arranged between the solenoid valve and the intracavity device.

In the event that the insufflation module comprises an impeller pump, the measurement of the volume and the pressure in the cavity is enabled continuously, for example, by means of the sensors.

On the other hand, the method of generation of a fluid volume in the cavity employing a system like that described, which comprises the use of impeller pumps, suction pumps and an image analysis module, comprises the steps of setting a working volume to be achieved in the cavity or a maximum concentration of smoke permitted in the cavity, by means of the obtention of images of the interior of the cavity by means of a camera disposed in the interior of the cavity and executing a round of image recognition in the image analysis module. As a result, the volume of the cavity or the concentration of smoke in the cavity is detected by means of said image analysis module, and the volume detected based on the obtained results as compared with the working volume, or the concentration of smoke in the cavity is compared with the maximum permitted concentration of smoke.

Finally, a command is issued from the processing unit of the monitoring and control of the homeostasis module which enables adjusting the volume in the cavity to the set working volume, or reducing the concentration of smoke below the permitted maximum. This command may consist in fluid insufflation to the cavity by means of activation of the insufflation pump, suck gas from the cavity by means of activation of the suction pump, a combination of both activities, or not to enable any activity.

When it may be necessary to reduce the concentration of the smoke below the permitted maximum, the impeller and suction pumps are employed to actively recirculate the fluid. Thus, the pumps are synchronized and they are activated to their maximum output, rapidly recirculating the fluid of the cavity, such that the concentration of smoke in the cavity is reduced by its passage through the filter. In this manner, the necessity for the introduction of fluid into the circuit is avoided, and instead avails of the already conditioned fluid in terms of temperature and humidity.

DESCRIPTION OF THE FIGURES

The following set of figures are provided for the purposes of illustration, but not limited thereto, as an integral part of the description provided here and as a complement thereof, with the object of enabling a better comprehension of the characteristics of the invention, in accordance with embodiments thereof.

FIGS. 1b and 1c represent enlarged views of two embodiments of trocars suitable to be employed in any embodiment of the present invention, e.g. in the system of FIG. 1a.

DESCRIPTION OF EMBODIMENTS OF THE INVENTION

The present invention relates to a system for the monitoring and control of the homeostasis in the interior of various types of cavities, for example, the abdomen or any other body cavity. In addition, the invention also relates to different methods of monitoring and control of the homeostasis which preferably employ said system.

Figure 1A:
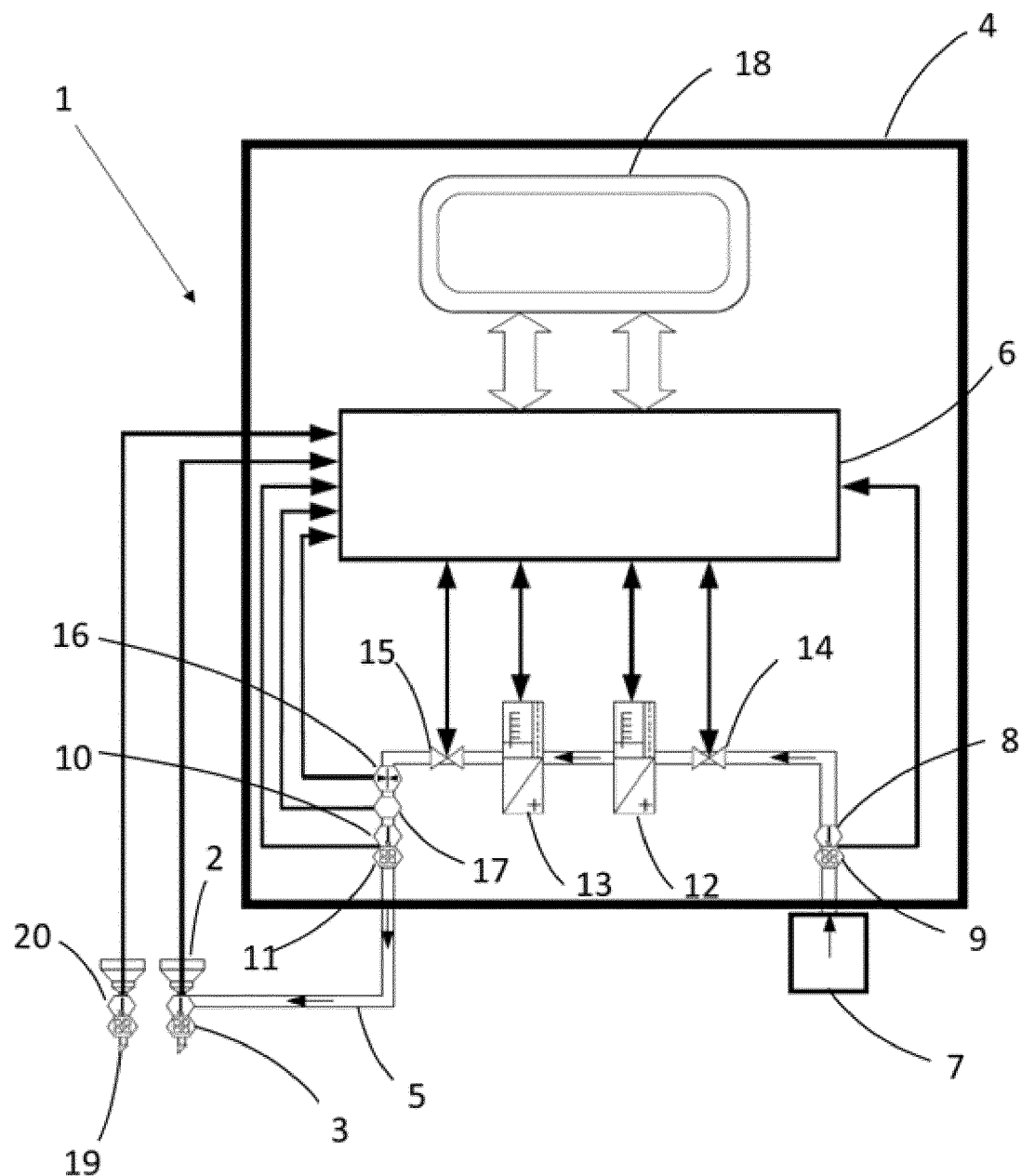
FIG. 1a represents a schematic view of an embodiment of the system of the invention.

FIG. 1a represents one embodiment of the system (1) of the invention, wherein an intracavity device (2) is employed which would be introduced into the interior of a cavity and would be charged with enabling the interchange of fluid to and from said cavity. In this case, the intracavity device (2) consists of a trocar.

A sensor module (3) comprising one or more sensors is attached to said intracavity device (2). The sensor module (3) enables monitoring of the temperature and humidity conditions inside the cavity in a continuous manner, and adjusting them to the basal temperature and humidity, if a relevant variation occurs. By said sensor unit being in the interior of the cavity, the direct measurement of said characteristics is enabled, instead of being inferred in an indirect manner by prior extraction of a fluid which can be found in the interior of the cavity. In this manner, the error introduced with this indirect process is reduced.

The basal data of temperature and humidity of the cavity may be measured with the same sensor module (3), after inserting the intracavity device into the cavity and before fluid is insufflated into the cavity for the endoscopic procedure. The sensor module (3) may be arranged on a surface of the insertable portion of the intracavity device (2) that is not in contact with the fluid flowing towards the cavity through the intracavity device.

FIG. 1b and FIG. 1c are enlarged views of two respective embodiments of intracavity devices (2, 2) in the form of trocars, which may be used in any embodiment of a system as provided herein, for example that of FIG. 1.

The trocars of FIGS. 1b and 1c have reference numerals referring to intracavity device (2) of FIG. 1a, but may be employed for any of the intracavitary devices of the system in its various embodiments.

In the perspective view of FIG. 1b, the intracavitary device (2) is a conventional trocar with a cannula (2a) intended to be inserted into the cavity, and through which the fluid to be insufflated is fed and flows towards the cavity. The cannula has a wall (2b), and the sensor module (3) may be attached on the outer surface of the cannula wall (2b), as shown in the figure, and connected to a cable (3a); the other end of the cable (3a) is attached to the monitoring and control of the homeostasis module (4) (see FIG. 1a).

The sensor module (3) may optionally be arranged inside a recess (not shown) that is formed on the outer surface of the cannula wall (2b).

FIG. 1c shows a view, partially cut through a vertical plane, of an intracavitary device (2') in the form of a double channel trocar having a channel or cannula (2a') enclosed by a wall (2b'), and an annular channel (2c') coaxially arranged around the cannula wall (2b'), and enclosed by an outer wall (2d').

The annular channel (2c') may have a number of openings (2e') on the outer wall (2d'), near the distal end, and a connector (2f) near the proximal end of the device (2').

Fluid may be insufflated into the cavity through the cannula (2a'), while the annular channel (2c') may be connected to a suction pump or similar device through the connector (2f), to suction fluid from the cavity. The fluid from the cavity enters the annular channel (2c') through the openings (2e').

This construction allows insufflating fluid and removing fluid from a cavity using only one intracavity device (2').

In the intracavity device (2') the sensor module (3) may be arranged between the outer surface of the cannula wall (2b') and the inner surface of the outer wall (2d'), inside the annular channel (2c'), as shown in FIG. 1c, and connected to a cable (3a); the other end of the cable (3a) is attached to the monitoring and control of the homeostasis module (4) (see FIG. 1a).

In embodiments of the trocar of FIG. 1c, the sensor module (3) may be attached to the outer surface of the cannula wall (2b'), or to either the inner or the outer surface of the outer wall (2d'), or in recesses or notches formed on these surfaces.

In all the above embodiments of the intracavity device (2, 2'), the sensor module (3) is outside the cannula wall, and therefore on the outside of the cannula itself and isolated or separated from the fluid that is being insufflated into the cavity through the cannula. This allows obtaining data or readings corresponding to the temperature and/or humidity existing inside the cavity, and not corresponding to the temperature and humidity of the fluid being insufflated.

In the case of the embodiment of the intracavitary device (2') that is shown in FIG. 1c, the sensor module (3) is in contact with the fluid that is being suctioned from the cavity, which will give an accurate reading of the conditions inside the cavity. It is noted, in this regard, that the openings (2e') for the inlet into the annular channel (2c') of the fluid being suctioned surround the cannula near its distal end but are sufficiently separate from the outlet of the cannula to prevent the readings of the sensor module (3) from being affected by the flow of fluid being insufflated through the cannula into the cavity.

As shown in FIGS. 1b and 1c, the sensor module (3) may be positioned in the distal half (dH) of the insertable portion of the intracavity device (2), which has an insertable length (L), for example in the distal third (dT) of the insertable length (L), preferably at a distance of at least 10 mm, for example at least 20 mm, from the distal end of the intracavity device (2, 2').

This position maintains the sensor module (3) isolated from the fluid flowing inside the cannula, and at the same time avoids the risk that the sensor module (3) may not reach the cavity when the device (2, 2') is inserted and remains in contact with patient tissue around the entry opening, due e.g. to the thickness of the patient tissue layers, or to movements of the intracavity device (2, 2') itself during the endoscopic procedure, thereby measuring tissue conditions instead of cavity conditions.

It is noted that for the sake of clarity, the proportions of FIGS. 1b and 1c are not necessarily to scale, for example regarding the size and shape of the sensor module (3).

The sensor module (3) is connected either via a cable (3a) or wirelessly to a monitoring and control of the homeostasis module (4), enabling analysis of the characteristics of the fluid of the interior of the cavity by means of a processing unit (6). The processing unit (6) is also charged with issuing commands to the rest of the elements connected thereto for the purpose of ensuring that homeostasis of the conditions in the cavity is maintained.

On the other hand, even if the data connection between the sensor module (3) and the monitoring and control of the homeostasis module (4) may be embodied in a wireless mode, there is a connection conduit (5) therebetween, in order to enable the passage of fluid to and from the monitoring module. Thus, the fluid found in the cavity can arrive at the monitoring and control of the homeostasis module (4), after previously passing through the sensor module (3), via said conduit (5).

The monitoring and control of the homeostasis module (4) does not need to be connected to a fluid insufflation means in order to monitor the intracavity conditions. Nevertheless, the monitoring and control of the homeostasis module is connected to a fluid insufflation module (7), which in this case consists of an insufflator, in order to permit the control of the intracavity homeostasis. The insufflator functions as a generator of continuous flux of fluid at a predetermined pressure. Thus, the insufflator pumps the fluid through the monitoring and control of the homeostasis module (4), and then to the conduit (5), and finally into the cavity through the intracavity device (2).

The monitoring and control of the homeostasis module (4) may comprise other elements, apart from the processing unit, in order to optimize the control of the homeostasis conditions in the interior of the cavity.

In particular, embodiments of the system may comprise a second group of sensors, comprising at least a volume sensor, such as a flowmeter or tachometer, and a pressure sensor. This second group of sensors may be inserted in the fluidic circuit between the insufflation module (7) and the intracavity device (2), i.e. they may be arranged outside the cavity.

In FIG. 1, said monitoring and control of the homeostasis unit (4) may comprise, additionally to the sensor module (3), sensors (8) of the temperature and sensors (9) of the humidity arranged to measure the characteristics of the fluid being sent by the insufflation module (7) towards the cavity, as well as sensors (10) of the temperature and sensors (11) of the humidity (11) arranged to measure the characteristics of the fluid exiting the cavity.

In addition, the monitoring and control of the homeostasis unit comprises a basic variable output humidifier and heating module (12) which enables the adaptation of the characteristics of the fluid being introduced into the cavity to those desired in the interior of the cavity. Subsequently, a second complementary variable output humidifier and heating module (13) may be disposed therein which enables a greater capacity of insufflation and suction of fluid, when the capacity of the basic variable output humidifier and heating module is insufficient, due to the entrance of a great quantity of fresh gas or an elevated recirculation of gas, providing greater reliability by having a backup module in case of failure of the basic variable output humidifier and heating module (12).

Here, "variable output humidifier and heating module" means a module which can be started-up and switched off, but is also one which is capable of incrementing the generation of heat, and/or the generation of humidity, for example, via an increase in the resistance of the heater to generate more heat, or for example, increasing the vaporization of water to compensate for the drying effect due to the heating.

The monitoring and control of the homeostasis module of FIG. 1 also comprises two solenoid valves (14, 15), one before the variable output humidifier and heating module (12, 13), and another disposed immediately thereafter. These solenoid valves (14, 15) enable closing the circuit at distinct points, particularly, in order to obtain data on the cavity side of the circuit without affecting the characteristics of the fluid being infused.

The monitoring and control of the homeostasis module also comprises a tachometer (16) which enables measurement of the volume of fluid which flows towards the interior of the cavity. The tachometer configures an extracavity sensor to measure the volume which is in the cavity. In addition, the monitoring and control of the homeostasis module also comprises a pressure sensor (17) which enables measurement of the pressure of the air insufflated towards the cavity. In particular, closing one or more of the solenoid valves (14, 15) enables measurement of the pressure which the fluid exercises on the cavity, since this pressure is the same existing in the conduit when one or more of the solenoid valves of the monitoring and control of the homeostasis module are closed. Thus, when the volume of the fluid measured by the tachometer reaches a predetermined value, the solenoid valves are closed and the pressure is measured.

The measurement of the pressure may also enable identification of the volume that exists in the interior of the cavity, thus avoiding the errors introduced in the measurement enabled by the tachometer, due to the leaks which may occur in the circuit. This identification of the volume from the measured pressure is made possible by the previous determination of the distensibility curve, since the curve links the pressure and the volume for a particular cavity of a particular patient, in particular conditions.

Once the fluid, conditioned by the monitoring and control of the homeostasis module (4), leaves said unit (4), the fluid passes through the conduit (5) to the intracavity device (2), and from there to the cavity.

The conduits which carry the heated and humidified gas from the monitoring and control of the homeostasis module (4) to the trocar or intracavity device (2) may comprise or be configured from a system of heated pipes, for example spiral conduits with resistances, like those used in respirators, to avoid condensation in the tubes and to optimize the system, thus avoiding cooling of the gas during the journey thereof through the meters of conduit.

The processing unit (6) of the monitoring and control of the homeostasis module (4) obtains the data of the various sensors of the system and controls the solenoid valves (14, 15). The processing unit also enables interaction with the user by means of the visualization module and/or the input of data (18).

The embodiment of the system of FIG. 1 may comprise a second intracavity device (19), preferably comprising a second sensor module (20), which enables measurement of the characteristics of the fluid in the interior of the cavity, at the same time as fluid is infused by another intracavity device, but without being affected by the passage of fluid therethrough, and transmits more precise data to the monitoring and control of the homeostasis module. In other words, even though the second intracavity device and sensor module are optional, the use of two intracavity devices and sensor modules improves the accuracy and safety of the measurements of the temperature and humidity inside the cavity, for example if one of the sensor modules is affected by light sources, or by blood inside the cavity.

Figure 2:
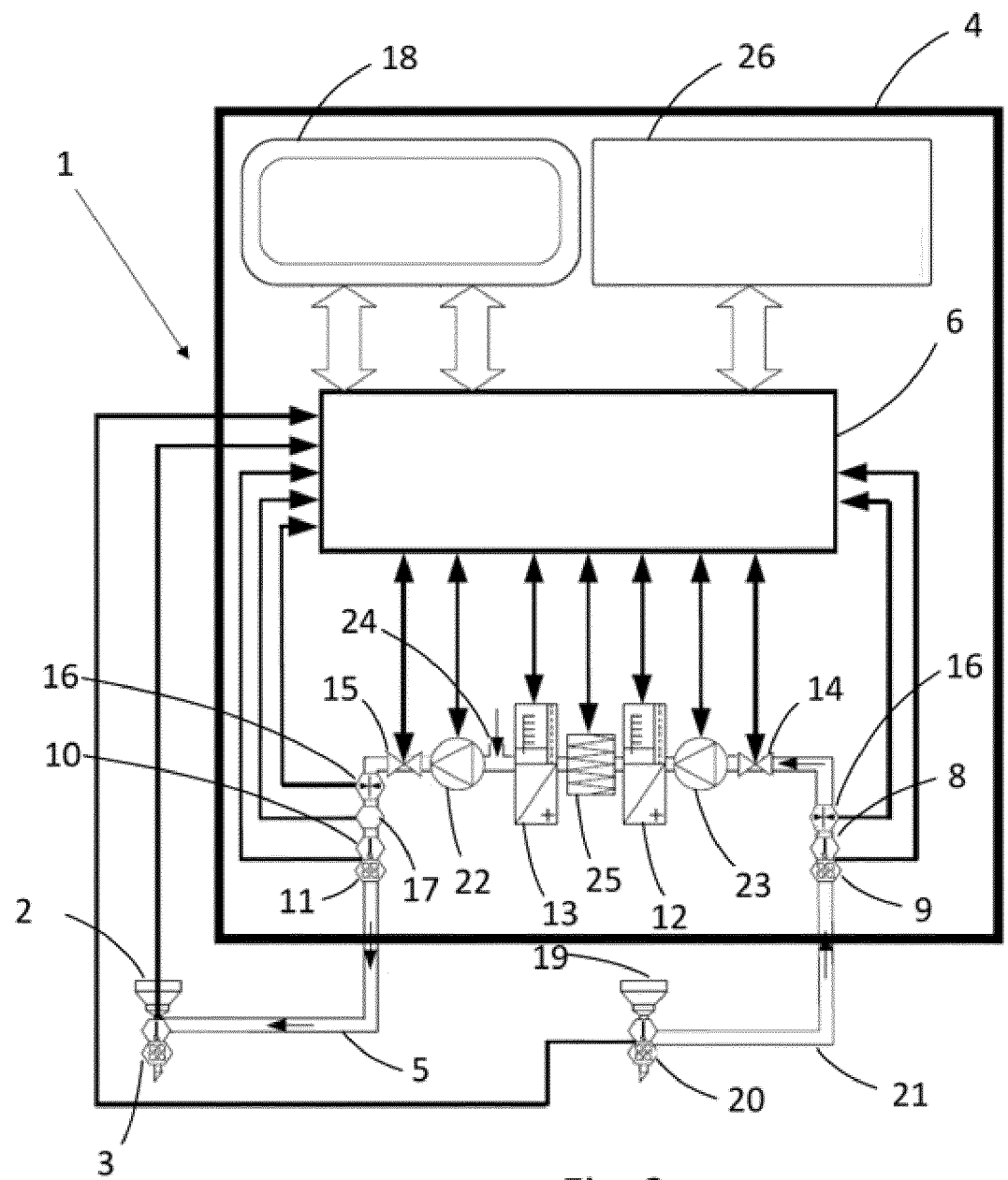
FIG. 2 represents a schematic view of an embodiment of the invention which comprises a recirculation circuit with two trocars.

FIG. 2 on the other hand, represents an embodiment of the system of the invention wherein the circuit enabled is a closed recirculation circuit. The system comprises two intracavity devices (2, 19) which are introduced into the interior of the cavity, such that a first intracavity device (2) infuses fluid towards the cavity, and a second intracavity device (19) extracts fluid from the cavity. In this manner, a pressurized closed-circuit is established wherein the fluid in the interior of the cavity is extracted via the second intracavity device (19), passing through a sensor module (20) disposed therein, and passes through a second conduit (21) towards the monitoring and control of the homeostasis module (4) for the conditioning thereof, such that the conditioned fluid passes towards the first conduit (5) for the handing over thereof to the first intracavity device (2) where there is the discharge thereof to the cavity to generate a closed-circuit once more.

In this manner, there is economy of resources since the fluid extracted from the cavity is closer to the basal conditions than fluid from an exterior source, such that the conditioning of said fluid is easier, in addition to enabling elimination of pollution and toxic particles from the fluid before the reintroduction thereof, and reducing the consumption of external fluid by recirculating the same fluid continuously.

Just as in the previous case, the monitoring and control of the homeostasis module (4) comprises a temperature (8, 10) and humidity sensor (9, 11) at the entrance and at the exit, a basic variable output humidifier and heating module (12) and a complementary humidifier and heating module (13), two solenoid valves (14, 15), one of which is disposed before the variable output humidifier and heating module, and the other disposed thereafter, two tachometers (16) which enables measurement of the volume of fluid which flows through the circuit, and a pressure sensor (17) enables measurement of the pressure of the air in the circuit and in the cavity.

In this embodiment, the monitoring and control of the homeostasis module (4) additionally comprises a suction pump (23) and an impeller pump (22), in order to enable pumping of the fluid to and from the cavity. A fluid entry (24) is established between the impeller pump and the complementary variable output humidifier and heating module, which is used to fill the cavity from an external source of fluid (not represented in the figures).

The external source of fluid may be connected to the entrance of the impeller pump (22) of the circuit, for example, by a diversion conduit as represented in the figure, with a valve (Not represented in the figure) to open the entrance of the fluid from the exterior source of fluid, when necessary.

The operation of the impeller pump (22) and the suction pump (23) are closely related to the manner of operation of the system, thus when there is a contrivance at maintaining the working volume in the cavity, once there is prior achievement thereof, both pumps (22, 23) function at a basic rhythm. In this operating mode, a slow recirculation of the fluid is produced, resulting in reduced flow of the impeller (22) and suction pumps (23), such that they are synchronized at a minimal recirculation, and the intracavity volume is maintained constant and the pressure thereof is maintained at the minimum necessary to maintain the working volume of the cavity.

On the other hand, when there is a contrivance at enabling rapid recirculation, for example, to evacuate smoke, the flow of both the impeller (22) and aspiration pumps (23) is increased, and the humidifier and temperature module (12) is activated to maintain gaseous conditions. When there is a leakage or loss of pressure, the flow of the impeller pump (22) is increased, but the flow of the suction pump (23) is not increased, in order to increase the quantity of fluid in the cavity via the addition of fresh fluid form the external source. Finally, when there is a pressure excess, the flow of the suction pump (23) is increased, while that of the insufflation pump (22) is not increased.

The circuit may comprise a fluid exit (Not represented in the figure), for example, controlled by a valve (Not represented in the figure). The valve may be also configured as an additional security device, being opened automatically at a predetermined pressure, for example 25 mmHg, and thus possible injury to the patient may be avoided in the case of system malfunction.

Furthermore, a filter (25) may be advantageously included in the closed circuit which is disposed between the basic variable output humidifier and heating module (12) and the complementary humidifier and heating module (13), which filters out the undesirable particles that the fluid may contain.

The fluid exit recited above is preferably disposed downstream of the filter (25), so that the exiting fluid does not adversely affect the health of the medical staff.

The system of FIG. 2 comprises an image analysis module (26), a camera and a CMOS sensor to obtain visual data of the interior of the cavity. Consequently, the camera and the CMOS sensor are disposed in the interior of the cavity and are preferably connected wirelessly to the image analysis module (26), which obtains the data of the camera and the CMOS sensor. The image analysis module (26) is connected with the processing unit (6) of the monitoring and control of the homeostasis module (4) for the purposes of acting on the elements of the system in accordance with the obtained visual data.

The intracavity devices (2, 2', 19) of FIGS. 1a, 1b, 1c and 2 may additionally comprise a set of light sensors and a set of light sources, such as LEDs, which are not shown in the figures, whose function is to enable acquisition of the visual data of the interior of the cavity by the image analysis module (26) with optimal illumination and quality, enabling the correct determination of the dimensions of the cavity and the quantity of smoke present in the same.

The light sources may preferably be attached on the outer surface of the intracavity devices, to be able to illuminate in a satisfactory way the cavity space. They may be positioned, similarly to the sensor module (3), in the distal half (dH) of the insertable length (L) of the intracavity device (2), for example in the distal third (dT) of the insertable length (L), and preferably at a distance of at least 10 mm from the distal end of the intracavity device (2, 2').

Figure 3:
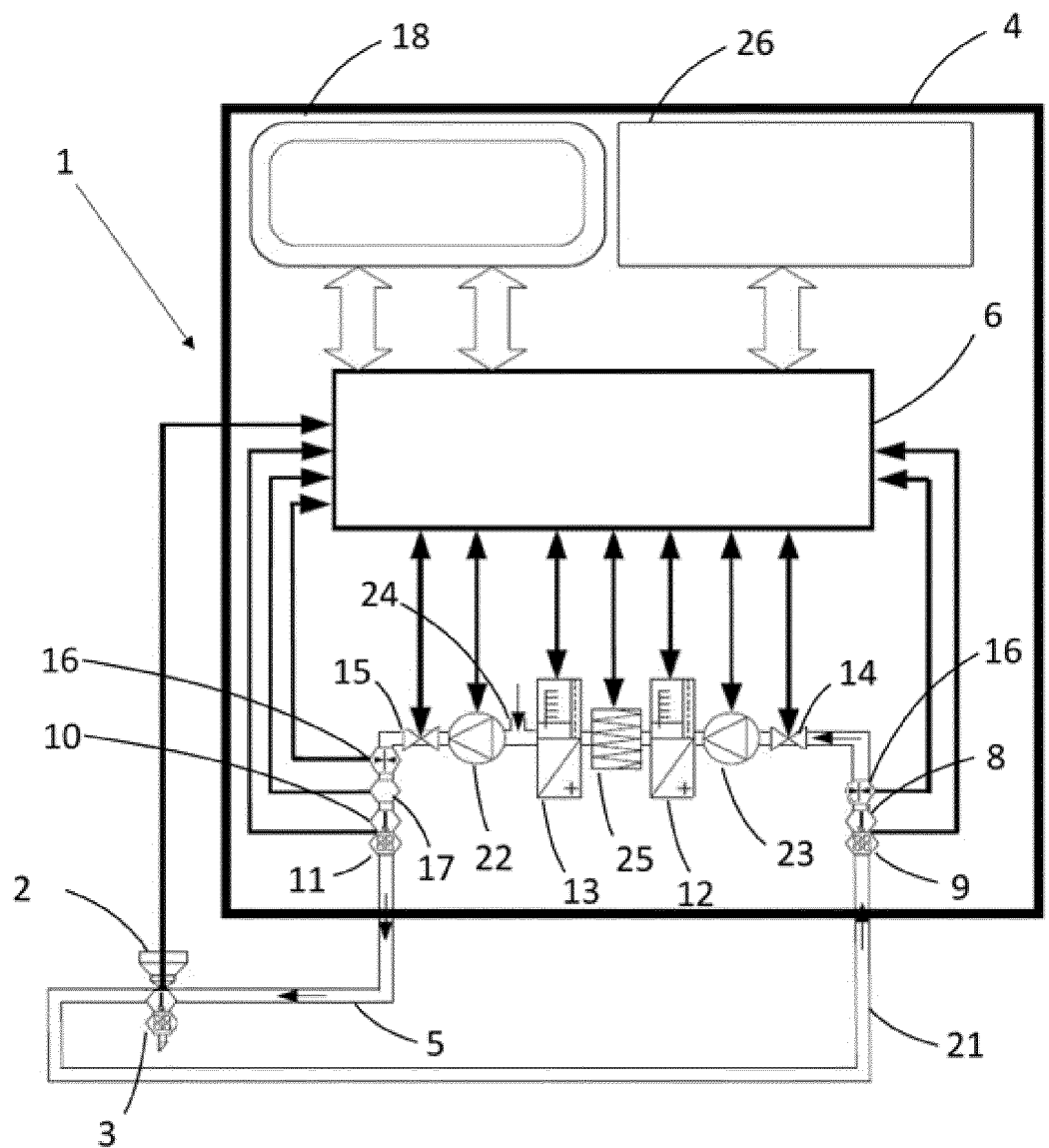
FIG. 3 represents a schematic view of an embodiment of the invention which comprises a recirculation circuit with a trocar.

FIG. 3 represents an alternative embodiment of the invention, similar to the previous embodiment, but the recirculation circuit is enabled using only one intracavity device (2). Thus, the intracavity device (2) comprises two internal chambers isolated from each other, both connected with the cavity, such that the first chamber enables infusion of fluid into the cavity, and the second chamber enables extraction of fluid from the cavity.

In this embodiment, the fluid extracted from the cavity, by means of the intracavity device (2), travels via the second conduit (21) to the monitoring and control of the homeostasis module (4), for the conditioning thereof, and then passes towards the first conduit (5) to arrive once more in the cavity, after passing through the intracavity device (2).

Hereafter, examples are represented of preferred embodiments of the method of generation of the invention of a volume of fluid in the cavity, while maintaining homeostasis conditions. One step of this method consists of determining the distensibility of the cavity and determining the optimal volume for each subject, or a range of optimal volumes that can be maintained in the cavity during the endoscopic procedure.

In each case, the relationship between the increase of pressure and the increase of volume are determined, and a range of optimal volumes is configured, while stressing the importance of establishing the point of inflection of the distensibility or maximum volume, after which the increments of pressure are disproportionately great for the same increment of volume.

Figure 4:
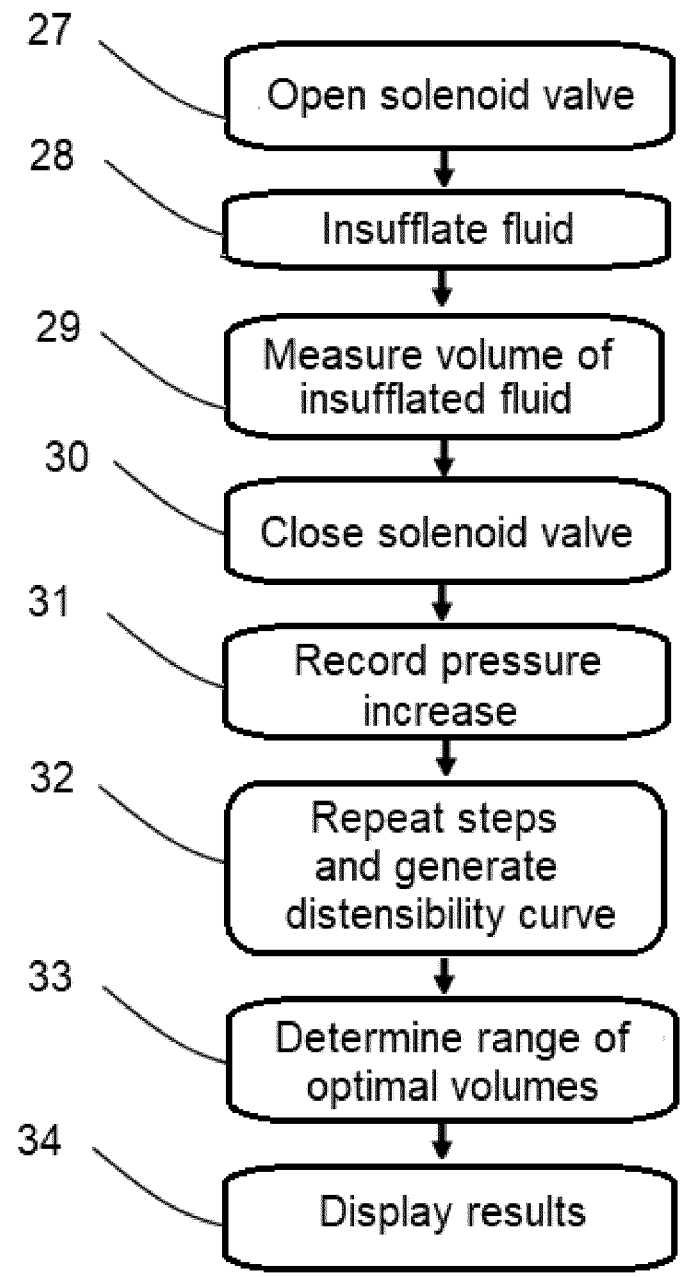
FIG. 4 represents a diagram of an embodiment of a method for determining the distension curve and a range of optimal volumes.

In particular, FIG. 4 represents an example of the determination of the distensibility and the range of optimal volumes, wherein there is the utilization of a system with one insufflator (7), and in which the monitoring and control of the homeostasis module (4) comprises a variable output humidifier and heating module (12.

The determination of the optimal volume comprises the steps of opening (27) a solenoid valve disposed between the insufflator and the intracavity device (2), to enable the passage of fluid towards the cavity, and thereafter insufflating (28) fluid at a fixed pressure during a previously determined period thereafter, by means of the insufflator. Then, the solenoid valve is closed (30), based on the measurement (29) of the volume of insulated fluid, and subsequently measurement and recording (31), by means of an extracavity sensor (17), of the pressure increase produced by the introduction of fluid to the cavity. The measurement of the pressure is performed on the solenoid valve side of the cavity with the object of recording the actual pressure in existence in the cavity, without being affected by the pressure of the fluid supplied by the insufflator.

The determination of the potential for expansion of the cavity is enabled based on the measurements taken, which are presented as a curve (distensibility curve) which relates the volume of fluid introduced and the resultant pressure generated in the cavity. It has been demonstrated that from a certain volume onwards, the increase in pressure related to the volume increase is disproportionately high, and different for each cavity and specific situation; in other words, the relationship becomes exponential.

The previous steps are repeated (32) with the object of obtaining a series of measurements of the volume of insufflated fluid and the pressure, and to thus generate the curve of the distensibility for the patient and the specific conditions.

The determination (33) of the range of optimal volumes is enabled as a range of volumes proximal to the point of inflection of the distensibility curve, and generally below that point. For example, the range of optimal volume could be a range with a maximum or upper limit value defined as the volume beyond which the increment of pressure is disproportionate, in other words, the volume at the point of inflection of the distensibility curve, and with a minimum value or lower limit value determined as the volume which generates a minimum pressure necessary to maintain the tension of the walls of the expanded cavity, which depends on the cavity and the endoscopic procedure, and which could be a predefined value as a function of the type of surgery. By way of an example, the minimum volume in laparoscopy is that which corresponds to approximately 6-8 mmHg.

Subsequently (34), the results are presented to the surgeon. If the surgeon had previously introduced into the system a working volume to be maintained in the cavity to enable an endoscopic procedure, the presentation of the results could include an indication to the surgeon of the position of the working volume in relation to the determined range of optimal volumes, and/or the position of the working volume in the obtained distensibility curve.

The distensibility curve of the cavity may be obtained at the beginning of the endoscopic procedure, and may be recalculated during the procedure, if this is deemed convenient, for example if the position of the patient is changed.

Figure 7:
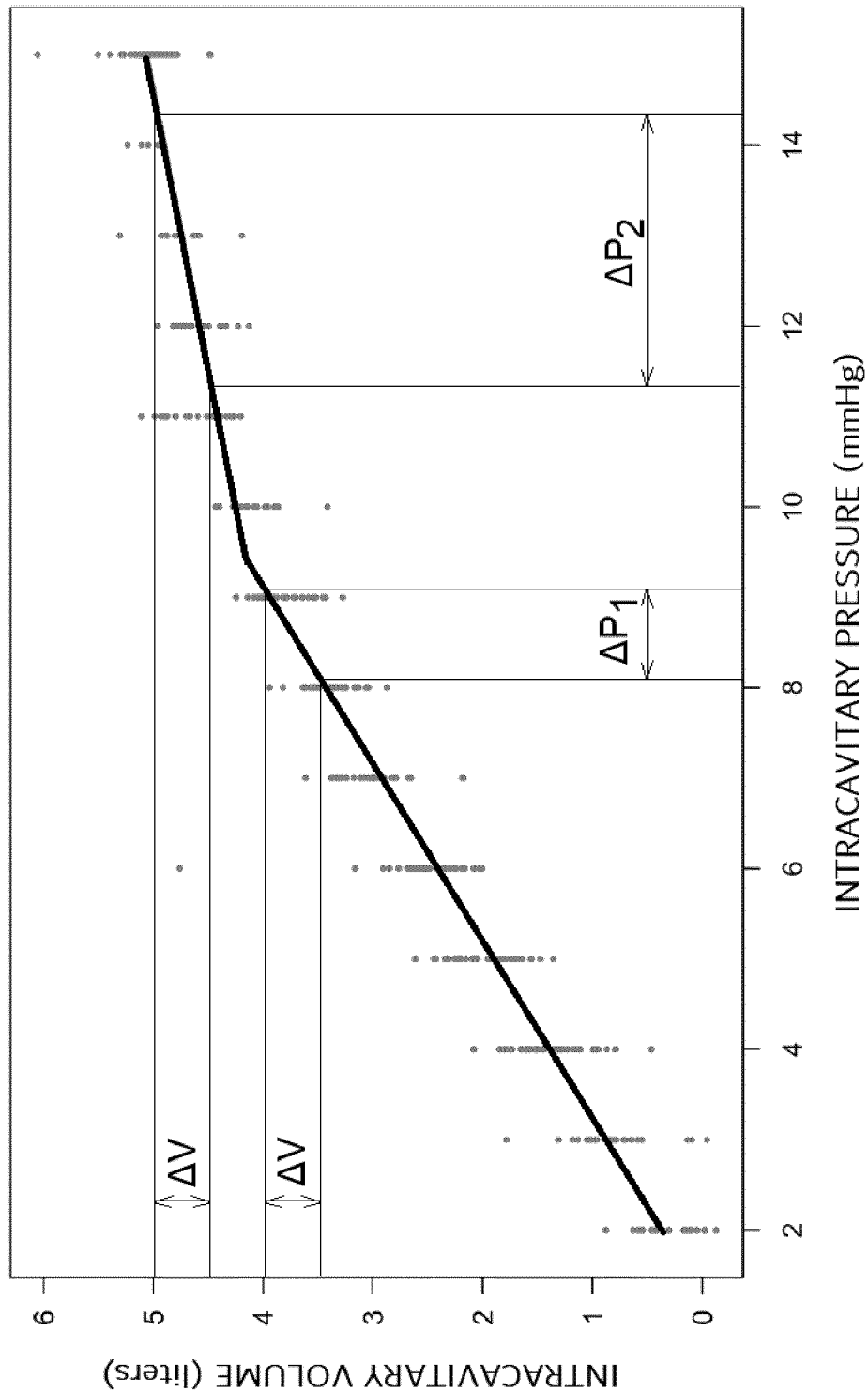
FIG. 7 represents an example of the distensibility curve of a cavity.

To better illustrate the concept of the optimal volume or range of optimal volumes, the graph in FIG. 7 represents data of a study implemented by the inventors on 92 patients subjected to an endoscopic surgical procedure, more specifically, a colorectal laparoscopy, described in the publication already recited above: "*A multifaceted individualized pneumoperitoneum strategy for laparoscopic colorectal surgery: a multicenter observational feasibility study*. (Surg Endosc. 2019 January; 33(1):252-260. doi: 10.1007/s00464-018-6305-y. Epub 2018 Jun. 27)."

As can be appreciated from FIG. 7, the volume of fluid in the cavity was measured at different pressures between 2 and 15 mmHg for each patient and the results are represented as points on a coordinates system. The results of the 92 patients were fitted to a curve as presented in FIG. 7: As can be appreciated, the data indicates that the relationship between the intracavity pressure and the volume of fluid insufflated to the cavity is not linear, but exhibits a point of inflection at which the gradient of the curve changes: specifically in this case, at a point at which the volume is slightly over 4 liters, and the pressure is between 9 and 10 mmHg.

As has been represented in the figure, in the zone below the point of inflection (that is to say, below approximately 4 L of volume), a volume increment ($\Delta V$) of approximately 0.5 L of insufflated air provokes a pressure increment ($\Delta P_1$) of approximately 1 mmHg, while in the zone above the point of inflection, the same increment of volume $\Delta V$ of some 0.5 L of air insufflated provokes a much greater pressure increment ($\Delta P_2$), of approximately 3 mmHg.

Even if the curve of FIG. 7 actually represents an average and not an individual case, in the case of a patient for whom a distensibility curve is obtained like that illustrated in FIG. 7, the range of optimal volumes is one which has as the maximum value the value of the point of inflection, which here is a value slightly over 4 L, and a minimum value which maintains the cavity expanded, which could be predefined in the system for each endoscopic procedure, or could be determined as a percentage of the maximum value, but it could be determined in other ways, or could be a value input by the surgeon based on their experience.

Additionally, the usual range of volumes for this type of operation being performed could be indicated on this same curve, which could be preprogrammed in the device in the form of the table, formula, database or the like, as previously mentioned, in accordance with statistical data related to the characteristics of the surgery and of the patient.

Alternatively, in any of the embodiments of the system and method described, the system could determine, based on the measurements implemented by the system or the obtained distensibility curve, a maximum volume, instead of a range of optimal volumes, after which the increment of pressure is disproportionately large for the same increment of volume (for example, the volume at the point of inflection of the distensibility curve, or a volume below that point), and present the surgeon with a value for the maximum volume, and/or the difference between the working volume selected by the surgeon and the maximum volume, as an absolute value and/or a percentage.

In any event, knowledge of the range of optimal volumes or the maximum volume could be availed of by the surgeon to evaluate the risk of maintaining a higher working volume in the cavity during an operation.

In practice, thanks to the information provided by the device about the optimal volume for the cavity of the patient and the specific case, and optionally, about the usual volume, the surgeon could establish a working volume, or a target volume, in accordance with their medical criteria, and the device would operate to maintain this working volume in the cavity during the operation.

Once the surgeon determines the working volume and inputs it to the system, the system enables a method to generate and/or maintain a volume of fluid in the cavity which is close to the working volume determined by the surgeon, that is to say, it may maintain a set volume, so that the surgeon may operate comfortably and in a secure manner.

Figure 5:
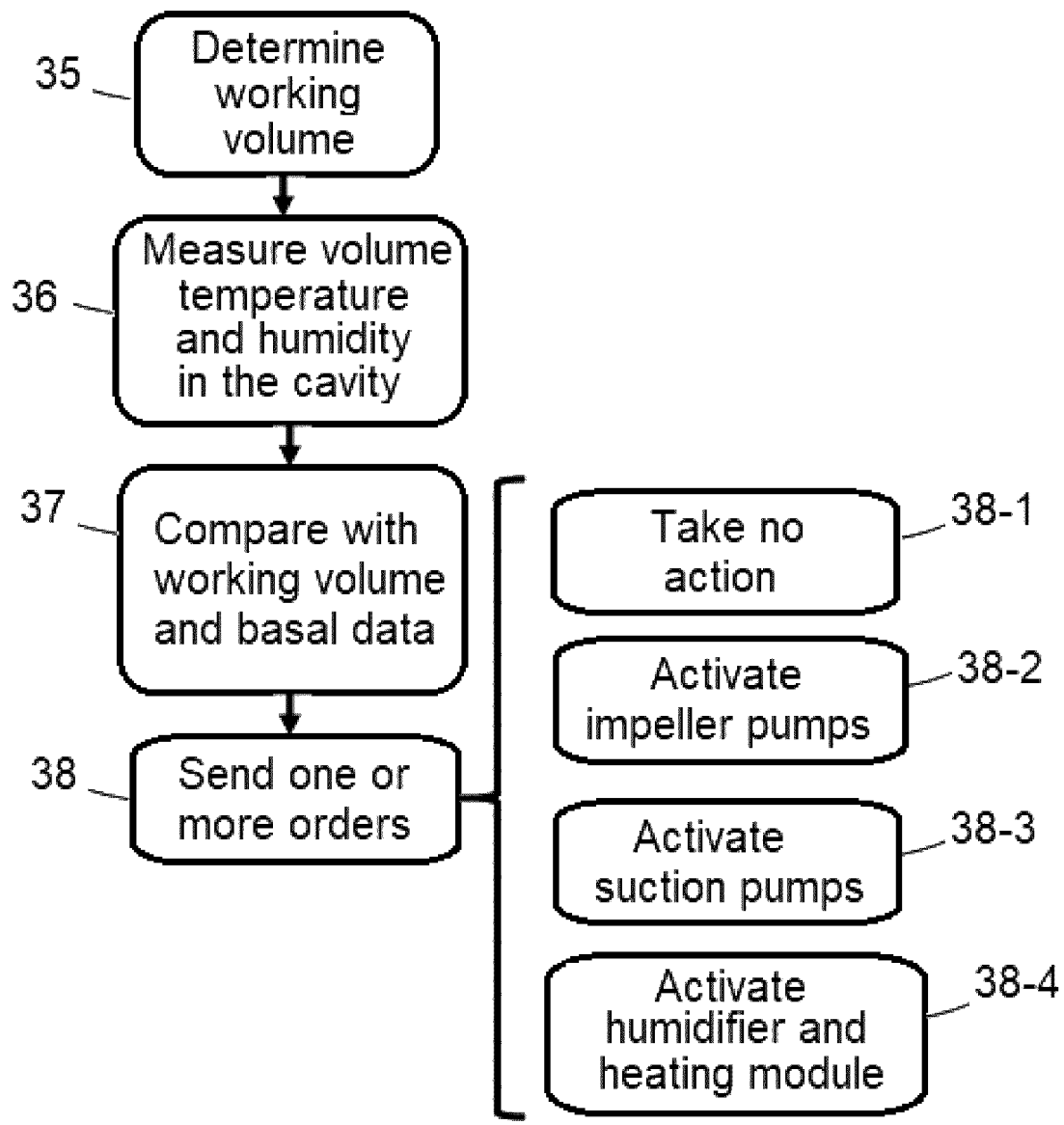
FIG. 5 represents a diagram of an embodiment of a method according to the invention for generation of a volume of fluid in a cavity.

FIG. 5 represents a diagram of a preferred embodiment of the invention of the method of generation of a volume of fluid in a cavity. The method employs a system with an insufflator and in which the monitoring and control of the homeostasis module comprises a variable output humidifier and heating module, and firstly comprises the above described step of determining (35) the working volume.

Once the working volume has been determined by the surgeon, the method of generation of the volume of fluid in the cavity comprises the steps of measuring (36) the volume of the fluid in the interior of the cavity.

The volume in the cavity may be determined as described above, based on the readings of one or more flowmeters or tachometers to determine the amount of fluid that has been insufflated towards the cavity (as well as the amount of fluid that has been suctioned from the cavity, in the applicable cases); alternatively, or additionally, it may be determined also based on the measures of the pressure in the cavity with pressure sensors, and on the volume corresponding to the measured pressure, according to the distensibility curve of the cavity.

Moreover, the humidity and temperature characteristics in said cavity are also measured (36), before insufflation of fluid, in order to obtain the basal temperature and humidity of the patient, and then periodically, e.g. in real time (for example approximately each second), during the endoscopic procedure.

The determined volume of the cavity is compared (37) with the working volume, and the temperature and humidity data obtained by the sensor module are compared (37) with the basal data. Commands are issued (38) to the distinct elements based on said comparison.

For the case illustrated in FIGS. 2 and 3, in which the insufflation module comprises an impeller pump (22) and a suction pump (23), those commands could be: activate (38-2) the impeller pump (22), activate (38-3) the suction pump (23), activate the humidification and heating module (38-4), different combinations of the above, or perform no action (38-1), which are the situations represented in FIG. 5.

For the case illustrated in FIG. 1, in which the insufflation module (7) consists of an insufflator, said commands may be: open the solenoid valve, activate the insufflator, close the solenoid valve, activate the humidifier and heating module (12), other combinations of the above, or perform no action.

In other embodiments of the method of generation of a volume of fluid in a cavity, the measurement of the temperature and the humidity, as well as the use of the humidification and heating module, may be omitted.

Figure 6:
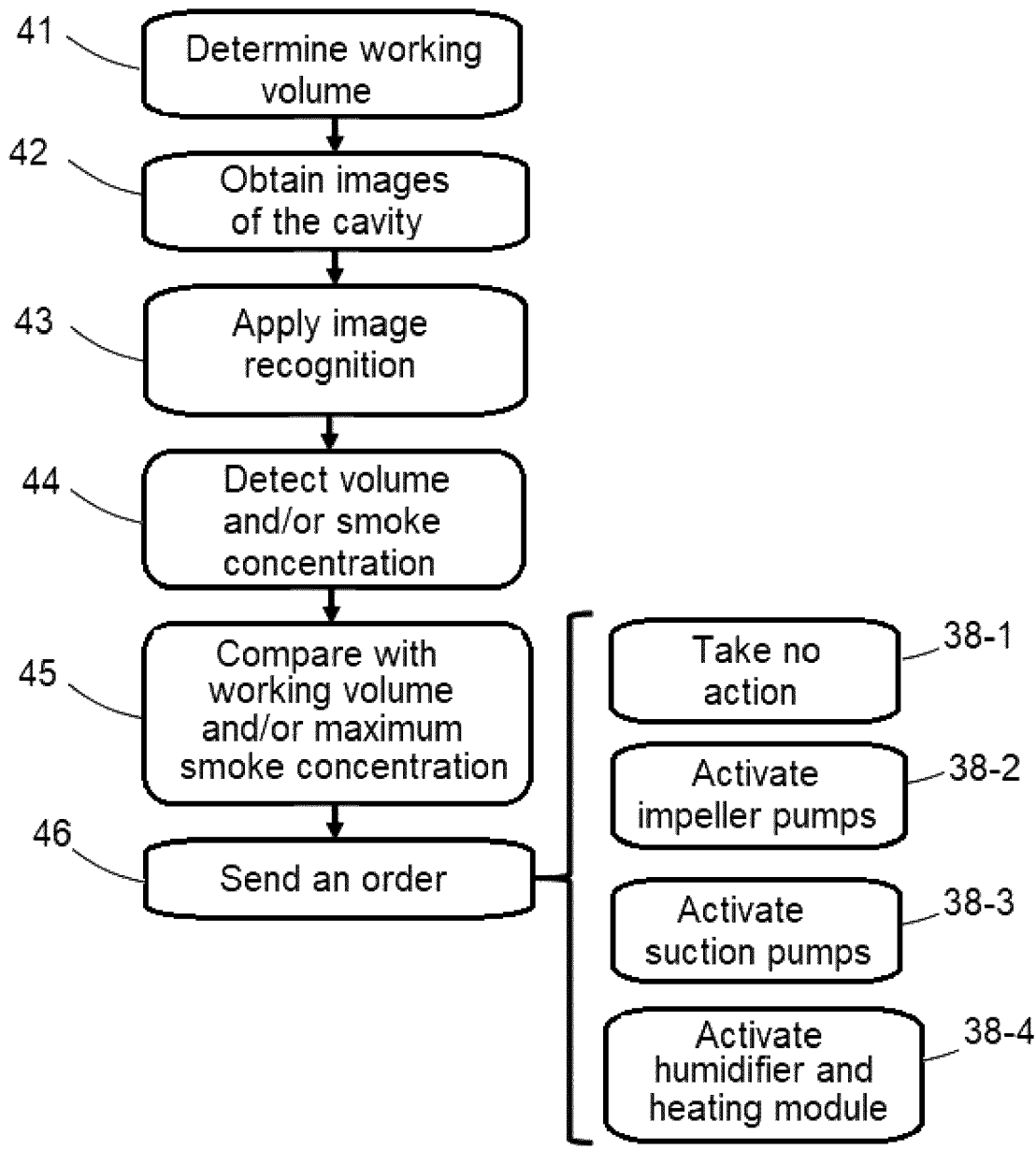
FIG. 6 represents a diagram of an embodiment of the method of the invention for generation of the volume of fluid in a cavity via an image analysis module.

FIG. 6 represents an alternative embodiment of the invention of the method of generation of a volume of fluid in a cavity. The embodiment illustrated employs a system like that represented in FIGS. 2 and 3, which includes an image analysis module (26), a camera and a CMOS sensor disposed in the interior of the cavity.

The method comprises a step of determining (41) the working volume and the input thereof to the system, something which the surgeon can do, for example, after any of the variations of the previously described process, in which the system determines a range of optimal volumes and informs the surgeon of this range. When the surgeon inputs an envisaged working volume, the system may present the position of this working volume with respect to the range of optimal volumes by way of information.

Once the working volume has been determined and input by the surgeon, there is the subsequent acquisition (42) of visual data of the interior of the cavity by means of the camera and the CMOS sensor, and an image recognition routine is applied (43) thereto with the object of acquiring (44) data concerning the volume which exists in the interior of the cavity at each point in time and the concentration of smoke present.

In some embodiments, the image recognition routine may involve previously training the system by machine learning, using a plurality of images of actual cavities in endoscopic processes, associated with corresponding recorded pressures and volumes, and also associated to other variables such as the kind of cavity (e.g. abdomen, thorax, etc.), patient characteristics, etc., and which may also be associated to a particular surgeon. The data of each implemented procedure may also be stored to dynamically improve the image recognition routine.

Subsequently, the obtained data is employed for comparison (45) with the target data. When the volume of the cavity is compared with the working volume, the concentration of smoke is compared with the previously determined maximum concentration of smoke. Commands are issued (46) to the different modules based on said comparison which may be: activate (38-2) the impeller pump (22), activate (38-3) the suction pump (23), combinations of the above or perform no action (38-1).

Thus, when the volume of the cavity is less than the working volume, the impeller pump (22) is activated (38-2), and alternatively, if the volume of the cavity is greater than the working volume, the suction pump (23) is activated. On the other hand, if the concentration of smoke is high, the fluid of the interior of the cavity is subsequently recirculated by means of a combination of the impeller (22) and suction (23) pumps.

For the sake of completeness, various aspects of the invention are presented in the following numbered clauses:

Clause 1. A modular system for the monitoring of the homeostasis in cavities for endoscopic procedures characterized by comprising:
- at least one intracavity device, having an insertable portion for to be arranged in the interior of the cavity;
- an insufflator to infuse or insufflate fluid towards the interior of the cavity via the intracavity device;
- a monitoring and control of the homeostasis module connected in series between the intra-cavity device and the insufflator;

wherein the monitoring and control of the homeostasis module comprises:
- a processing unit;
- at least a sensor of volume, or of pressure or of both, connected to the processing unit; and
- a solenoid valve which controls the passage of fluid and is located in series with the sensor or sensors, the insufflator and the intracavity device, in a manner in which the sensor or sensors are designed to measure the volume of the fluid which has been introduced and/or the pressure of the fluid between the closed solenoid valve and the cavity.

Clause 2. A modular system for the monitoring of the homeostasis in cavities for endoscopic procedures characterized by comprising:
- at least one intracavity device;
- a monitoring and control of the homeostasis module connected to the intracavity device;

wherein the monitoring and control of the homeostasis module comprises an impeller pump connected between a source of fluid and the intracavity device, to generate a flux of fluid from and/or towards the cavity.

Clause 3. The modular system according to clause 2 wherein the insufflation of fluid module additionally comprises at least one suction pump connected between and intracavity device and the impeller pump and synchronized with the impeller pump.

Clause 4. The modular system according to any of the clauses 2 or 3, which additionally comprises:
- fluid conduits which connect the intracavity device to the monitoring and control of the homeostasis module, and wherein at least one intracavity device comprises a double channel designed to permit the passage of fluid towards the interior of the cavity, via a first conduit, and in an independent manner, towards the exterior of the cavity, via a second conduit, so as to create a closed recirculation fluid system, wherein the fluid is actively recirculated.

Clause 5. The modular system according to any one of clauses 2 or 3, which additionally comprises:
- at least a first intracavity device and a second intracavity device, which are connected to the monitoring and control of the homeostasis module, wherein the first intracavity device comprises a channel designed to permit the passage of the fluid towards the interior of the cavity, and the second intracavity device comprises a channel designed to permit the passage of fluid towards the exterior of the cavity, so as to create a closed fluid recirculation system, wherein the fluid is actively recirculated at least by the impeller pump and optionally by the impeller pump and the suction pump.

Clause 6. The modular system according to any one of the clauses 2 to 5, which additionally comprises at least a particulate filter disposed along the closed fluid recirculation system.

Clause 7. The modular system according to any one of clauses 2 to 6, wherein the impeller pump is one of variable flow and is controlled by the processing unit to maintain and intracavity volume as a function of a working volume input by the user into the system and on the readings of the volume sensor and/or the pressure sensor disposed in series with the impeller pump and connected to the processing unit.

Clause 8. The modular system according to any one of the clauses 3 to 7, wherein the suction pump is one of a variable flow and is controlled by the processing unit in synchrony with the impeller pump to drive the fluid along the length of the closed fluid recirculation system.

Clause 9. The modular system according to any one of clauses 2 to 8, wherein the monitoring and control of the homeostasis module additionally comprises at least one volume sensor arranged to measure the volume of fluid in the cavity, and/or a pressure sensor disposed to measure the pressure in the cavity, or both sensors, with at least one volume sensor and/or pressure sensor connected to the processing unit.

Clause 10. The modular system according to clause 9, wherein the volume sensor and/or the pressure sensor is an extra-cavity sensor, situated outside of the cavity and connected in series with the impeller pump and with the intracavity device, preferably between the exit of the impeller pump and the intracavity device.

Clause 11. The modular system according to any one of clauses 1 to 10, which additionally comprises an image analysis module connected to a camera and a CMOS sensor situated in the interior of the cavity, and to the processing unit of the monitoring and control of the homeostasis module.

Clause 12. The modular system according to clause 11, wherein the intracavity device additionally comprises one or more light sensors, one or more LEDs or combinations of both.

Clause 13. The modular system according to any one of clauses 1 to 12, wherein the monitoring and control of the homeostasis module additionally comprises a variable output humidification and heating module, controlled by the processing unit to modify the humidity and/or the temperature of the fluid being insufflated or of the recirculated fluid as a function of the data obtained by the sensor module.

Clause 14. The modular system according to clause 13, wherein the sensor module is situated in a recess of the intracavity device.

Clause 15. The modular system according to any one of clauses 1 to 14, wherein the intracavity device is a trocar.

Clause 16. A method of generation and/or maintenance of a working volume via a fluid in a cavity, for example for an endoscopic procedure, which comprises:
- input to the system the desirable working volume to be maintained in the cavity;
- insufflate fluid to the cavity;
- determine the relationship which exists between the insufflated volume and to the pressure variation in the cavity by a successive measurements of the volume and pressure in the cavity;
- determine a distensibility curve of the cavity and/or a range of optimal volumes of the cavity based on the determined relationship;

compare the input working volume with the distensibility curve and/or with the range of optimal volumes obtained;

implement one or more of the following actions as a function of the results of the comparison:

present to the position of the working volume with respect to the range of optimal volumes or the distensibility curve in a visualization device; and/or issue a warning signal if the working volume falls outside the range of optimal volumes and/or is above the point of inflection of the distensibility curve; and/or periodically compare the volume of the cavity with the working volume during a subsequent endoscopic procedure, and in the case that the difference between the measured volume and to the working volume exceeds a predetermined value, insufflate fluid to the cavity or extract fluid from the cavity to reestablish the working volume in the cavity.

Clause 17. The method according to clause 16, which avails of an intracavity homeostasis system according to any of clauses 1 to 15.

Clause 18. A method of generation and/or maintenance of a working volume via a fluid in a cavity, characterized by comprising the following steps:

insufflate fluid to the cavity;

obtain at least data of the volume of the cavity, via a pressure sensor, a volume sensor or an image analysis module;

compare the measured volume of the cavity with a predetermined working volume to be maintained in the cavity, via the processing unit of the monitoring and control of the homeostasis module;

in the case that the difference in absolute value between the measured volume of the cavity and the working volume is superior to a predetermined threshold, insufflate fluid or extract fluid to/from the cavity.

Clause 19. A method of generation or maintenance of a working volume via a fluid in the cavity, characterized by comprising the following steps:

implement an iterative process of insufflation of a volume of fluid into the cavity and measurement of the resultant volume and pressure in the cavity;

determine a curve relating the variation of the volume to the variation of the pressure in the cavity after the previous step, and determine an optimal range of volumes defined as a range of volumes below a point of inflection of the curve, above which the same increment of volume produces a superior increment of pressure;

optionally superimpose a range of usual volumes on the curve for the type of endoscopic procedure in hand, based on statistical and preprogrammed data;

inform a user of the range of optimal volumes obtained and optionally present the distensibility curve, and/or the range of optimal volumes and/or the range of usual volumes on the visualization screen.

Clause 20. The method according to any one of clauses 16 to 19 which additionally comprises the steps of:

obtain at least the data of the temperature and humidity of the interior of the cavity, via a sensor module disposed on a surface of the intracavity device that is in contact with the fluid present inside the cavity, for example on an outer wall of the intracavity device, and near the distal end of the intracavity device, for example in the distal half of the insertable portion of the intracavity device;

transmit the data obtained to the processing unit of the monitoring and control of the homeostasis module;

compare the data of the temperature and humidity obtained with the basal data of the patient, via the processing unit of the monitoring and control of the homeostasis module;

in the case that the data obtained in the basal data are discordant, activate the humidification and heating module for the purposes of heating and/or humidifying the fluid being insufflated.

Clause 21. The method according to any one of clauses 16 to 20 where in the determination of the range of optimal volumes comprises the following steps:

a) insufflate fluid to the cavity during a certain period;

b) measure the volume of the insufflated fluid via at least one volume sensor;

c) close off the passage of fluid to the cavity;

d) record the increment of the pressure in the cavity, via at least one sensor;

e) repeat steps a) to d);

f) plot the curve which defines the relationship between the volume of insufflated fluid to the increment of the pressure in the cavity based on the data obtained, and define a range of optimal volumes as a range of volumes whose upper limit is the volume of a point of inflection of the curve, and the lower limit is determined by the user, or is a predefined value, or is a percentage of the upper limit; and g) optionally superimpose a range of usual volumes for the type of endoscopic procedure in hand on the curve, based on statistical and pre-programmed data in the control system of the method.

Clause 22. A method of generating a volume of fluid in a cavity which comprises the steps of:

insufflate fluid into the cavity;

determine a working volume to be achieved in the cavity or a maximum permitted concentration of smoke in the cavity;

obtain images of the interior of the cavity via a camera introduced into the cavity via the intracavity device;

execute an image recognition routine in the image analysis module;

detect the volume of the cavity or the concentration of smoke in the cavity, based on the results of the image recognition routine;

compare the detected volume with the working volume, or the concentration of smoke in the cavity with the maximum permitted concentration of smoke; and emit a command from the processing unit of the monitoring and control of the homeostasis module selected from among: insufflate fluid to the cavity via the activation of the insufflation pump, suck gas from the cavity via the activation of the suction pump, a combination of both actions or no implementation of either actions, with the object of equalizing the volume of the cavity with the working volume or maintaining the concentration of the smoke in the cavity below the permitted maximum.

Clause 23. A method of monitoring and control of the homeostasis in cavities, in particular to maintain or generate homeostasis conditions in a cavity during an endoscopic process, which comprises:

determine the working volume to be achieved in the cavity;

obtain at least data of the volume of the cavity;

compare the volume of the cavity with the working volume;

in the case where the difference between the measured volume and the working volume is superior to a predetermined threshold, and notified by displaying the information on the screen, enabling insufflation of fluid to the cavity or extraction of fluid from the cavity to reestablish the working volume, if the operator so wishes.

Clause 24. A method for maintaining or generating conditions of homeostasis in a cavity during an endoscopic process, which comprises:
- (a1)—determine the desired working volume to be maintained in the cavity;
- (b1)—insufflate fluid into the cavity;
- (c1)—determine the volume of the cavity;
- (d1)—compare the determined volume of the cavity with the working volume;
- (e1)—in the case of a difference between the determined volume and the working volume that is superior to a predetermined threshold, insufflate fluid into the cavity or extract fluid from the cavity to reestablish the working volume; and
- (f1)—periodically repeat steps (c1) to (e1) during the endoscopic procedure.

Clause 25. A method of maintaining or generating conditions of homeostasis in a cavity during an endoscopic process, which comprises:
- (a2)—insufflate fluid into the cavity;
- (b2)—measure the volume of the insufflated fluid;
- (c2)—record the increase of pressure generated in the cavity by the increase of the volume;
- (d2)—repeat the steps (a2) to (c2) a plurality of times;
- (e2)—determine, based on the volume and pressure measurements, a distensibility curve of the cavity and a point of inflection of the curve above which, for the same increase in volume, the increase in the pressure in the cavity starts to be greater; and
- (f2)—determine a range of optimal volumes for the cavity as a range of volumes below the point of inflection, or about the point of inflection.

Clause 26. The method according to clause 25, which additionally comprises:
- (g2)—input, before or after the steps (a2) to (f2), the desired working volume to be maintained in the cavity;
- (h2)—compare the working volume input with the range of optimal volumes obtained; and
- (i2)—display the relative position of the working volume with respect to the determined range of optimal volumes, and/or issue a warning if the working volume falls outside the range of optimal volumes.

Clause 27. The method according to clause 26, which additionally comprises implementing, after step (i2), the steps of the method of clause 24.

Clause 28. The method according to any one of clauses 18 to 27, which utilizes a system according to any one of clauses 1 to 15.

Clause 29. The system according to any one of clauses 1 to 15 or 33 to 37, which comprises a processing unit configured to receive the signals of sensors and data entered by the user, and to implement the method of any one of clauses 16 to 28.

Clause 30. A modular system for the monitoring of the homeostasis in cavities for endoscopic procedures, comprising:
- at least one intracavity device, having an insertable portion to be arranged in the interior of a cavity and a channel for the passage of fluid towards the cavity;
- at least one sensor module disposed on the insertable portion of the intracavity device, for example on an outer surface thereof, to sense the conditions of fluid that is present inside the cavity, the sensor module comprising at least one temperature or humidity sensor, or both, configured to measure the temperature and/or humidity inside the cavity;
- a variable output humidifier and heating module;
- a fluid insufflation module configured to infuse or insufflate a fluid into the interior of the cavity; and
- a monitoring and control of the homeostasis module connected to the sensor module and to the fluid insufflation module, and which comprises a processing unit; the processing unit being configured to operate the humidifier and heating module to modify the temperature and/or the humidity of the fluid being insufflated based on the data obtained by the sensor module.

Clause 31. The modular system according to clause 30, wherein the intracavity device comprises a recess in the insertable portion, near the distal end thereof, for example in the distal half thereof, the recess being formed on an outer surface of the intracavity device, so that in use it is exposed to the cavity and in contact with fluid present inside the cavity, and wherein the sensor module is disposed inside the recess.

Clause 32. The system according to any of clauses 30 or 31, wherein the processing unit is configured to control the system to perform said step of operating the humidifier and heating module to modify the temperature and/or the humidity of the fluid being insufflated, based on the data obtained by the sensor module, by:
- prior to insufflation of fluid into the cavity, obtaining at least the basal data of temperature and humidity of the patient, from the readings of the sensor module;
- after insufflation of fluid into the cavity, obtaining at least data of the temperature and the humidity of the interior of the cavity, from the readings of the sensor module;
- comparing the data of the temperature and humidity obtained after insufflation of fluid with the basal data of the patient; and
- in the case that the difference between the data obtained after insufflation of fluid and the basal data is superior to a predetermined threshold, heating and/or humidifying the fluid to be insufflated to adjust the temperature and/or the humidity in the cavity to the basal data of the patient.

Clause 33. A modular system for the monitoring of the homeostasis in cavities for endoscopic procedures, comprising:
- at least one intracavity device, having an insertable portion to be arranged in the interior of a cavity and a channel for the passage of fluid towards the cavity;
- a fluid insufflation module configured to infuse or insufflate a fluid into the interior of the cavity; and
- a monitoring and control of the homeostasis module connected to the fluid insufflation module, and which comprises a processing unit;

the processing unit being configured to control the modular system to implement the following steps:
- record in the processing unit a working volume to be maintained in the cavity;
- operate the fluid insufflation module to insufflate fluid into the cavity;
- obtain a measure of the volume of the cavity;
- compare the measured volume of the cavity with the recorded working volume;

in case that the difference, in absolute value, between the measured volume and the recorded working volume is above a predetermined threshold, insufflate fluid to the cavity or extract fluid from the cavity to reestablish the recorded working volume in the cavity.

Clause 34. The modular system according to clause 33, further comprising at least a volume sensor and at least a pressure sensor, arranged so that the fluid being insufflated flows through the volume sensor and pressure sensor,
wherein the monitoring and control of the homeostasis module is connected to the volume sensor and pressure sensor, and
wherein the processing unit is configured to obtain a measure of the volume of the cavity based on the data obtained by the volume sensor and pressure sensor.

Clause 35. The modular system according to clause 33, further comprising:
an image analysis module connected to the processing unit of the monitoring and control of homeostasis module,
a camera and a CMOS sensor to be arranged in the interior of the cavity via the intracavity device, and
one or more light sensors and one or more light sources, to be arranged in the cavity via the intracavity device, and
wherein the processing unit is configured to obtain a measure of the volume of the cavity based on images of the interior of the cavity obtained by the camera and an image recognition routine performed by the image analysis module.

Clause 36. The system according to any of clauses 33 to 35, wherein the processing unit is configured to control the system to additionally implement the following steps, before at least some of the steps of clause 33:
a) insufflate fluid into the cavity during a predetermined period;
b) measure the volume of insufflated fluid;
c) close the passage of fluid to the cavity when a predetermined volume is reached;
d) record the pressure increase in the cavity which has been generated by this volume increase;
e) repeating steps a) to d);
f) based on the obtained volume and pressure measures, determine a distensibility curve of the cavity and a point of inflection of the distensibility curve beyond which the same increase in volume results in a greater increase of the pressure in the cavity; and, optionally
g) determine a range of optimal volumes as a range of volumes below the point of inflection or about the point of inflection; and, optionally
h) issuing information to a user, by:
h1) displaying in a visualization device the relative position of the predetermined working volume and/or the measured volume with respect to the distensibility curve or the range of optimal volumes, and/or
h2) issuing a warning if the working volume and/or the measured volume is beyond a predetermined distance from the point of inflection of the distensibility curve, or is outside the range of optimal volumes.

Clause 37. The system according to clause 36, wherein the processing unit is configured to control the system to additionally implement the following steps:
obtaining a measure of the pressure in the cavity based on readings of the pressure sensor;
determining the volume present in the cavity, based on the measured pressure in the cavity and on the determined distensibility curve of the cavity;
in case that the difference, in absolute value, between the determined volume and the recorded working volume is above a predetermined threshold, insufflate fluid to the cavity or extract fluid from the cavity to reestablish the recorded working volume in the cavity.

Clause 38. The system according to any of clauses 36 or 37, further comprising the features of the system according to any of clauses 30 to 32.

Clause 39. The system according to any of clauses 30 to 32 or 38, wherein the sensor module is arranged on the intracavity device, outside the channel or cannula for the passage of fluid towards the cavity to avoid contact with this fluid passage, and preferably wherein the sensor module is positioned in the distal half of the insertable length of the intracavity device, preferably in the distal third of the insertable length, and preferably at a distance of at least 10 mm form the distal end of the intracavity device.

Clause 40. An intracavity device for use in endoscopic procedures, such as a trocar, comprising an insertable portion to be arranged in the interior of a body cavity, at least one channel, and one or more light sources, such as LEDs, attached to the outer surface of the insertable portion.

Clause 41. An intracavity device for use in endoscopic procedures, such as a trocar, comprising an insertable portion to be arranged in the interior of a body cavity, at least one channel, and one or more light sensors attached to the outer surface of the insertable portion.

Clause 42. An intracavity device for use in endoscopic procedures, such as a trocar, comprising an insertable portion to be arranged in the interior of a body cavity, at least one channel, one or more light sources, such as LEDs, and one or more light sensors, at least one light source and/or at least on light sensor being attached to the outer surface of the insertable portion.

The invention claimed is:

1. A modular system for the monitoring of the homeostasis in cavities for endoscopic procedures, comprising:
at least one intracavity device, having an insertable portion to be arranged in the interior of a cavity and a channel for the passage of fluid towards the cavity;
at least one sensor module, the at least one sensor module comprising at least one temperature or humidity sensor, or both, configured to measure the temperature and/or humidity inside the cavity;
a variable output humidifier and heating module;
a fluid insufflation module configured to infuse a fluid into the interior of the cavity;
a second group of sensors, comprising at least a volume sensor, and at least a pressure sensor, the second group of sensors being arranged so that the fluid being insufflated flows through the volume sensor and the pressure sensor;
a monitoring and control of the homeostasis module connected to the at least one sensor module, to the second group of sensors, and to the fluid insufflation module, and which comprises a processing unit; and
at least a first conduit which has a first end, connected to the monitoring and control of the homeostasis module, and a second end connected to the intracavity device;
the processing unit being configured to control the modular system to implement the following actions:
a) insufflate fluid into the cavity during a predetermined period;
b) measure a volume of insufflated fluid;
c) close a passage of fluid to the cavity when a predetermined volume is reached;

d) record a pressure increase in the cavity which has been generated by this volume increase;
e) repeat a) to d);
f) based on the obtained volume and pressure measures, determining a distensibility curve of the cavity and a point of inflection of the distensibility curve beyond which the same increase in volume results in a greater increase of the pressure in the cavity; and,
g) determine a range of optimal volumes as a range of volumes below the point of inflection or about the point of inflection;

and the processing unit being configured to control the modular system to additionally implement the following actions:
operate the humidifier and heating module to modify the temperature and/or the humidity of the fluid being insufflated based on the data obtained by the sensor module;
record in the processing unit a working volume to be maintained in the cavity;
operate the fluid insufflation module to insufflate fluid into the cavity;
obtain a measure of the volume of the cavity based on the data obtained by the second group of sensors;
compare the measured volume of the cavity with the recorded working volume;
responsive to a difference, in absolute value, between the measured volume and the recorded working volume being above a predetermined threshold, insufflate fluid to the cavity or extract fluid from the cavity to reestablish the recorded working volume in the cavity.

2. The modular system according to claim 1 wherein the intracavity device is a trocar.

3. The modular system according to claim 1 wherein the intracavity device comprises a recess in the insertable portion, formed on an outer surface of the channel for the passage of fluid towards the cavity, and wherein the sensor module is disposed inside the recess.

4. The modular system according to claim 1 wherein the monitoring and control of the homeostasis module additionally comprises at least a valve, arranged in series between the volume sensor and the pressure sensor, and connected to the processing unit so as to be controlled to open or close the passage of fluid towards the cavity, such that the volume sensor is arranged to measure the volume of the fluid flowing towards the cavity when the valve is open, and the pressure sensor is arranged to measure the pressure of the fluid in the cavity when the valve is closed.

5. The modular system according to claim 1 further comprising one or more light sources arranged on an outer surface of the insertable portion of the intracavity device and connected to the monitoring and control of homeostasis module.

6. The modular system according to claim 1 wherein the fluid insufflation module at least comprises an impeller pump, and a connection for connecting the impeller pump to at least one external fluid source.

7. The modular system according to claim 6 wherein the fluid insufflation module additionally comprises at least a suction pump, synchronized with the impeller pump.

8. The modular system according to claim 7, which additionally comprises a second conduit which connects the intracavity device to the monitoring and control of homeostasis module, and
wherein the intracavity device comprises a channel for the passage of fluid towards the interior of the cavity and connected to the first conduit, and a second channel, independent from the first, for the passage of fluid from the interior of the cavity and connected to the second conduit,
whereby the first and second conduits and the first and second channels form a closed fluid recirculation system through the cavity, wherein the fluid is actively recirculated.

9. The modular system according to claim 7, which additionally comprises:
a second conduit, and
a second intracavity device having an insertable portion to be arranged in the interior of the cavity and a channel for the passage of fluid from the cavity and out of the cavity,
the second conduit connecting the second intracavity device to the monitoring and control of homeostasis module,
whereby the first and second conduits, the channel of the intracavity device, and the channel of the second intracavity device form a closed fluid recirculation system through the cavity, wherein the fluid is actively recirculated.

10. The system according to claim 1 wherein the processing unit is configured to control the system to operate the humidifier and heating module to modify the temperature and/or the humidity of the fluid being insufflated, based on the data obtained by the sensor module, by:
prior to insufflation of fluid into the cavity, obtaining the basal data of temperature and humidity of the patient, from the readings of the sensor module;
after insufflation of fluid into the cavity, obtaining data of the temperature and the humidity of the interior of the cavity, from the readings of the sensor module;
comparing the data of the temperature and humidity obtained after insufflation of fluid with the basal data of the patient; and
responsive to a difference between the data obtained after insufflation of fluid and the basal data being above a predetermined threshold, heating and/or humidifying the fluid to be insufflated to adjust the temperature and/or the humidity in the cavity to the basal data of the patient.

11. The system according to claim 1, wherein the processing unit is configured to determine a distensibility curve, after adjusting the temperature and/or the humidity in the cavity to the basal data of the patient, and control the system to operate the humidifier and heating module to modify the temperature and/or the humidity of the fluid being insufflated, based on the data obtained by the sensor module, by:
prior to insufflation of fluid into the cavity, obtaining the basal data of temperature and humidity of the patient, from the readings of the sensor module;
after insufflation of fluid into the cavity, obtaining data of the temperature and the humidity of the interior of the cavity, from the readings of the sensor module;
comparing the data of the temperature and humidity obtained after insufflation of fluid with the basal data of the patient; and
responsive to a difference between the data obtained after insufflation of fluid and the basal data being above a predetermined threshold, heating and/or humidifying the fluid to be insufflated to adjust the temperature and/or the humidity in the cavity to the basal data of the patient.

12. The system according to claim 1 wherein the processing unit is additionally configured to compare the recorded working volume, and/or the volume measured at any time of the endoscopic procedure, with the determined distensibility curve or with the determined range of optimal volumes, and
to display in a visualization device the relative position of the working volume and/or the measured volume with respect to the distensibility curve or the range of optimal volumes, and/or
to issue a warning if the working volume and/or the measured volume is beyond a predetermined distance from the point of inflection of the distensibility curve, or is outside the range of optimal volumes.

13. A modular system for the monitoring of the homeostasis in cavities for endoscopic procedures, comprising:
at least one intracavity device, having an insertable portion to be arranged in the interior of a cavity and a channel for the passage of fluid towards the cavity,
a fluid insufflation module configured to infuse a fluid into the interior of the cavity,
a monitoring and control of the homeostasis module which comprises a processing unit,
at least a first conduit which has a first end, connected to the monitoring and control of homeostasis module, and a second end connected to the intracavity device,
an image analysis module connected to the processing unit of the monitoring and control of homeostasis module,
a camera and a CMOS sensor to be arranged in the interior of the cavity via the intracavity device, and
one or more light sensors and one or more light sources, to be arranged in the cavity via the intracavity device,
the processing unit being configured to control the modular system to:
record in the processing unit a working volume to be maintained in the cavity;
operate the fluid insufflation module to insufflate fluid into the cavity;
obtain a measure of the volume of the cavity;
compare the measured volume of the cavity with the recorded working volume;
responsive to a difference, in absolute value, between the measured volume and the recorded working volume being above a predetermined threshold, insufflate fluid to the cavity or extract fluid from the cavity to reestablish the recorded working volume in the cavity.

14. The modular system according to claim 13, wherein the light sources, have adjustable light intensity.

15. The system according to claim 13 wherein the processing unit is additionally configured to control the system to perform the following:
obtain images of the interior of the cavity via the camera housed in the cavity via the intracavity device;
execute an image recognition routine in the image analysis module;
determine the volume of the cavity and/or the concentration of smoke in the cavity, based on the results of the image recognition routine;
compare the volume determined with the recorded working volume and/or the concentration of smoke in the cavity with a predetermined maximum permitted concentration of smoke; and
issue a command selected from the group consisting of: insufflating fluid into the cavity by activating the insufflation module; sucking gas from the cavity by means of the activation of a suction pump; a combination of both actions; or neither of the actions; in order to equalize the volume of the cavity to the working volume and/or maintain the concentration of smoke in the cavity below the permitted maximum.

16. A method of generating and/or maintaining a volume in a body cavity during endoscopic procedures, by using a fluid, comprising:
providing an intracavity device with an insertable portion, and a sensor module;
introducing in the body cavity the insertable portion of the intracavity device;
obtaining the basal data of temperature and humidity of the patient, via the sensor module;
after obtaining said basal data, insufflating fluid into the body cavity;
obtaining data of the temperature and/or humidity of fluid present in the interior of the body cavity, via the sensor module;
comparing the data of the temperature and/or humidity obtained with said basal data of the patient;
responsive to a determination that the data obtained after insufflating fluid and said basal data obtained before insufflating fluid are discordant, heating and/or humidifying the fluid being insufflated.

17. A method according to claim 16, further comprising:
obtaining a measure of the volume of the body cavity;
comparing the measured volume of the body cavity with a predetermined working volume to be maintained in the body cavity;
in case that the difference, in absolute value, between the measured volume of the body cavity and the working volume is above a predetermined threshold, insufflate fluid or extract fluid to/from the body cavity.

18. A method according to claim 17, further comprising, prior to obtaining a measure of the volume of the body cavity:
a) insufflating fluid into the body cavity during a certain period;
b) measuring the volume of insufflated fluid;
c) closing the passage of fluid to the body cavity when a certain volume is reached;
d) recording the increased pressure increase in the body cavity which has been generated by this increased volume increase;
e) repeating steps a) to d) to obtain several successive volume and pressure measures;
f) based on the obtained volume and pressure measures, determining a distensibility curve of the body cavity and a point of inflection therein beyond which the same increase in volume results in a greater increase of the pressure in the body cavity;
g) determining a range of optimal volumes as a range of volumes below the point of inflection or about the point of inflection, and
h) issuing information to a user, by:
h1) displaying in a visualization device the relative position of the predetermined working volume and/or the measured volume with respect to the distensibility curve or the range of optimal volumes, and/or
h2) issuing a warning if the working volume and/or the measured volume is beyond a predetermined distance from the point of inflection of the distensibility curve, or is outside the range of optimal volumes.

19. A method of maintaining or generating conditions of homeostasis in a body cavity during an endoscopic procedure, the method comprising:
insufflating fluid to the body cavity;
determining a relationship between an insufflated volume and a pressure variation in the body cavity by making successive measurements of a volume and a pressure in the body cavity while insufflating the fluid;

determine a distensibility curve of the body cavity and/or a range of optimal volumes of the body cavity based on the determined relationship;

compare a desired working volume to be maintained in the body cavity with the distensibility curve and/or with the range of optimal volumes obtained; and implementing one or more of the following actions, depending on the results of the comparison:

- presenting the position of the desired working volume with respect to the range of optimal volumes and/or the distensibility curve in a visualization device; and/or
- issuing a warning signal if the desired working volume falls outside the range of optimal volumes and/or is above a point of inflection of the distensibility curve; and/or
- during a subsequent endoscopic procedure, comparing the volume of the body cavity with the desired working volume, and in case that the difference in absolute value between the measured volume and the desired working volume exceeds a predetermined threshold, insufflating fluid into the body cavity or extracting fluid from the body cavity to reestablish the working volume in the body cavity.

* * * * *